(12) United States Patent
Tsumagari et al.

(10) Patent No.: US 7,580,614 B2
(45) Date of Patent: *Aug. 25, 2009

(54) INFORMATION PLAYBACK APPARATUS HAVING EXPANSION INFORMATION STORAGE UNIT AND INFORMATION PLAYBACK METHOD

(75) Inventors: Yasufumi Tsumagari, Yokohama (JP); Hideki Mimura, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 882 days.

This patent is subject to a terminal disclaimer.

(21) Appl. No.: 10/729,107

(22) Filed: Dec. 8, 2003

(65) Prior Publication Data

US 2004/0120695 A1 Jun. 24, 2004

(30) Foreign Application Priority Data

Dec. 9, 2002 (JP) .............................. 2002-357120

(51) Int. Cl.
*H04N 7/00* (2006.01)
*H04N 5/00* (2006.01)
(52) U.S. Cl. ...................... 386/95; 386/125; 386/126
(58) Field of Classification Search ......... 386/125–126, 386/95
See application file for complete search history.

(56) References Cited

U.S. PATENT DOCUMENTS

| | | | | |
|---|---|---|---|---|
| 5,990,955 A | * | 11/1999 | Koz | 375/240.01 |
| 6,296,187 B1 | * | 10/2001 | Shearer | 235/462.41 |
| 7,194,196 B2 | * | 3/2007 | Yamamoto et al. | 386/125 |
| 7,292,610 B2 | * | 11/2007 | Toida et al. | 370/535 |
| 2002/0088011 A1 | * | 7/2002 | Lamkin et al. | 725/142 |
| 2003/0007779 A1 | * | 1/2003 | Miyata et al. | 386/46 |
| 2004/0120695 A1 | | 6/2004 | Tsumagari et al. | |

FOREIGN PATENT DOCUMENTS

| | | |
|---|---|---|
| CN | 1135071 A | 11/1996 |
| JP | 9-50437 | 2/1997 |
| JP | 9-163182 | 6/1997 |
| JP | 9-251763 | 9/1997 |
| JP | 10-312644 | 11/1998 |
| JP | 11-161663 | 6/1999 |

OTHER PUBLICATIONS

U.S. Appl. No. 10/729,107, filed Dec. 8, 2003, Tsumagari et al.

(Continued)

*Primary Examiner*—Robert Chevalier
*Assistant Examiner*—Daquan Zhao
(74) *Attorney, Agent, or Firm*—Oblon, Spivak, McClelland, Maier & Neustadt, P.C.

(57) ABSTRACT

An information playback apparatus according to one aspect of the present invention has a first acquisition unit configured to acquire contents from an information storage medium, a second acquisition unit configured to acquire expansion information from at least one of the information storage medium and an external apparatus via a communication line, a storage unit configured to store the expansion information acquired by the second acquisition unit in accordance with the type of information, and a playback unit configured to play back the contents acquired by the first acquisition unit, and to play back the expansion information stored in the storage unit in synchronism with playback of the contents.

4 Claims, 16 Drawing Sheets

OTHER PUBLICATIONS

U.S. Appl. No. 10/742,903, filed Dec. 23, 2003, Tsumagari et al.
U.S. Appl. No. 10/795,504, filed Mar. 9, 2004, Tsumagari et al.
U.S. Appl. No. 11/084,810, filed Mar. 21, 2005, Taira et al.
U.S. Appl. No. 10/372,899, filed Feb. 26, 2003, Tsumagari et al.
U.S. Appl. No. 10/640,260, filed Aug. 14, 2003, Tsumagari et al.
U.S. Appl. No. 10/740,617, filed Dec. 22, 2003, Tsumagari et al.

* cited by examiner

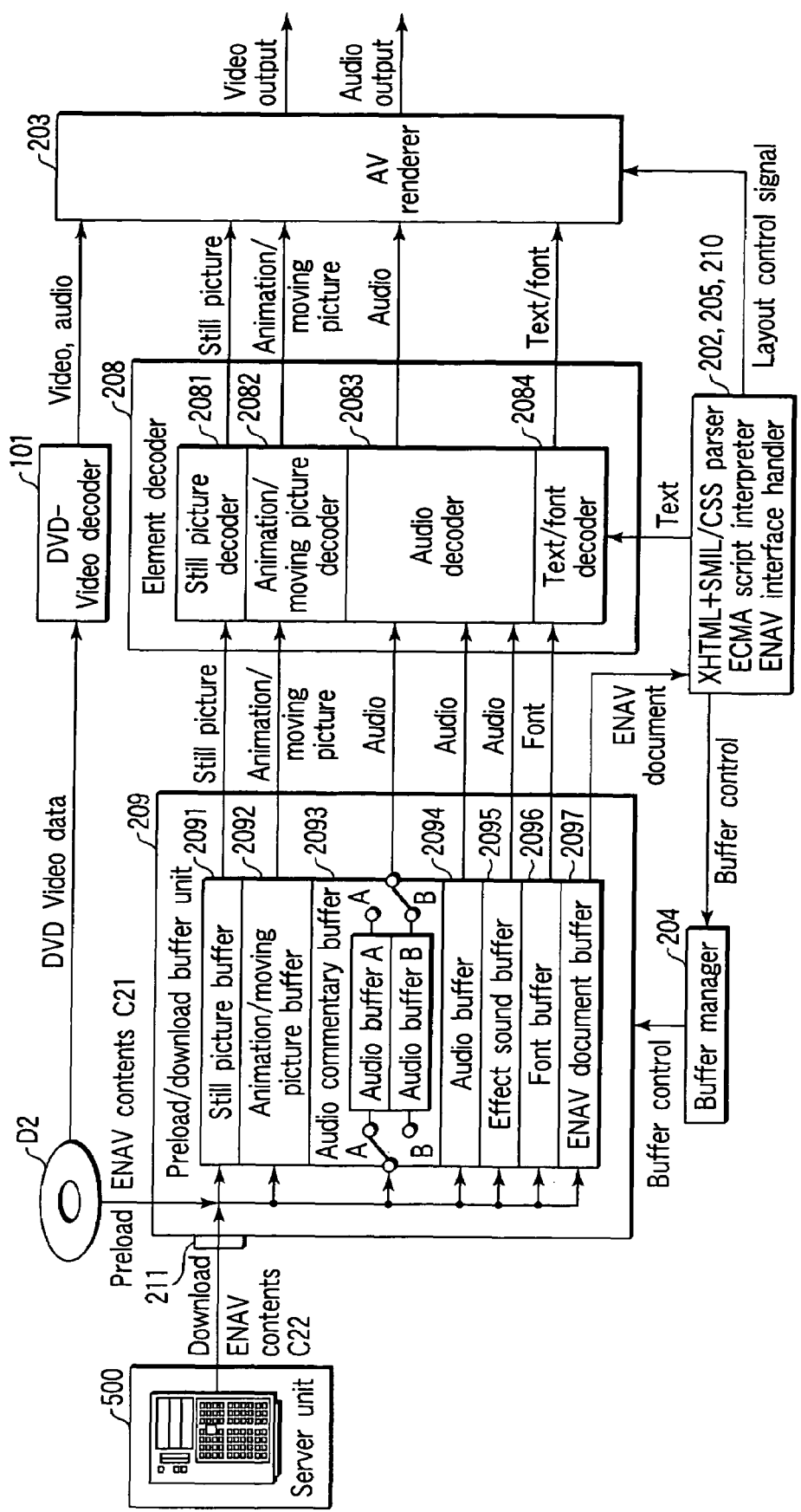
F I G. 4

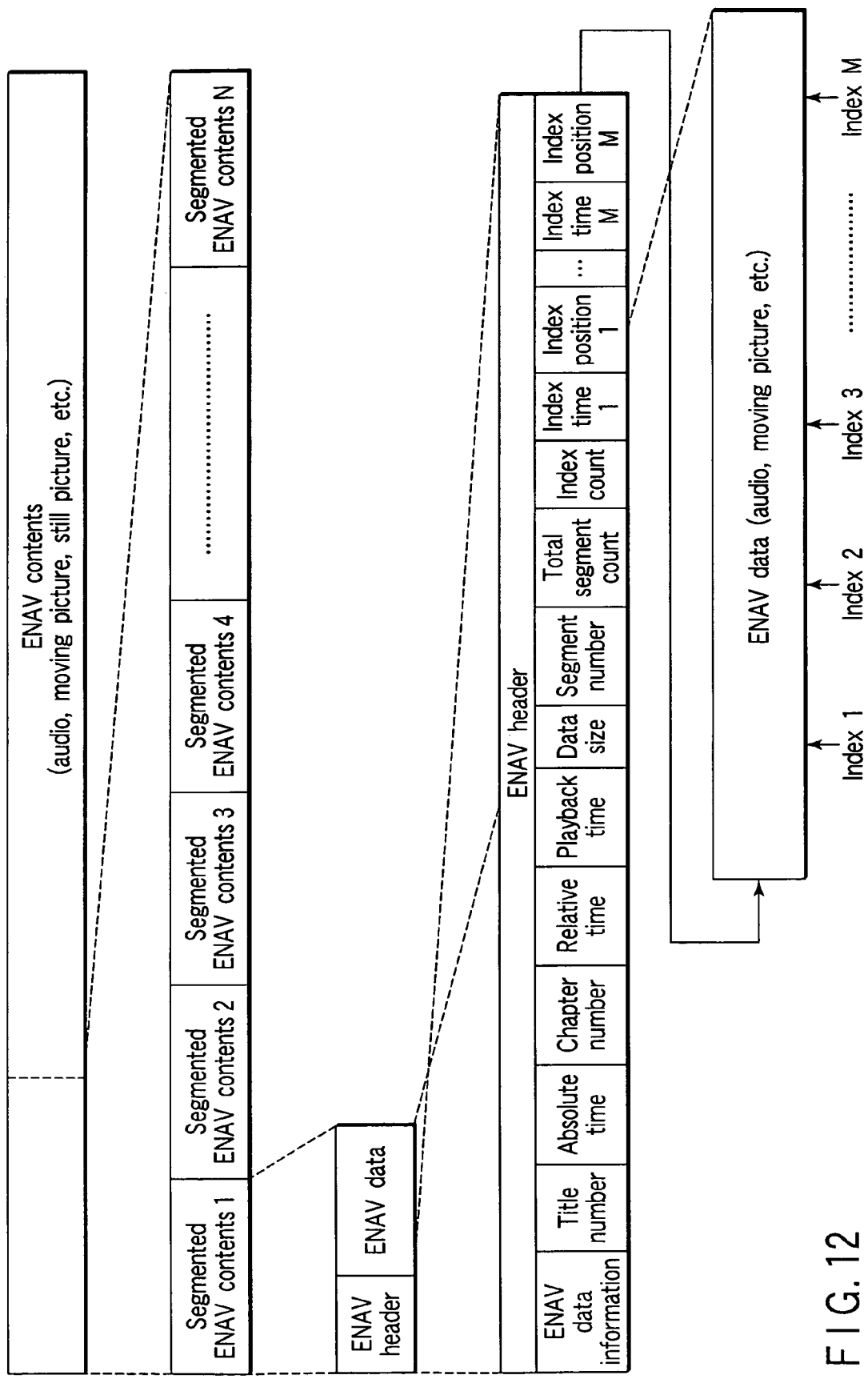
F I G. 12

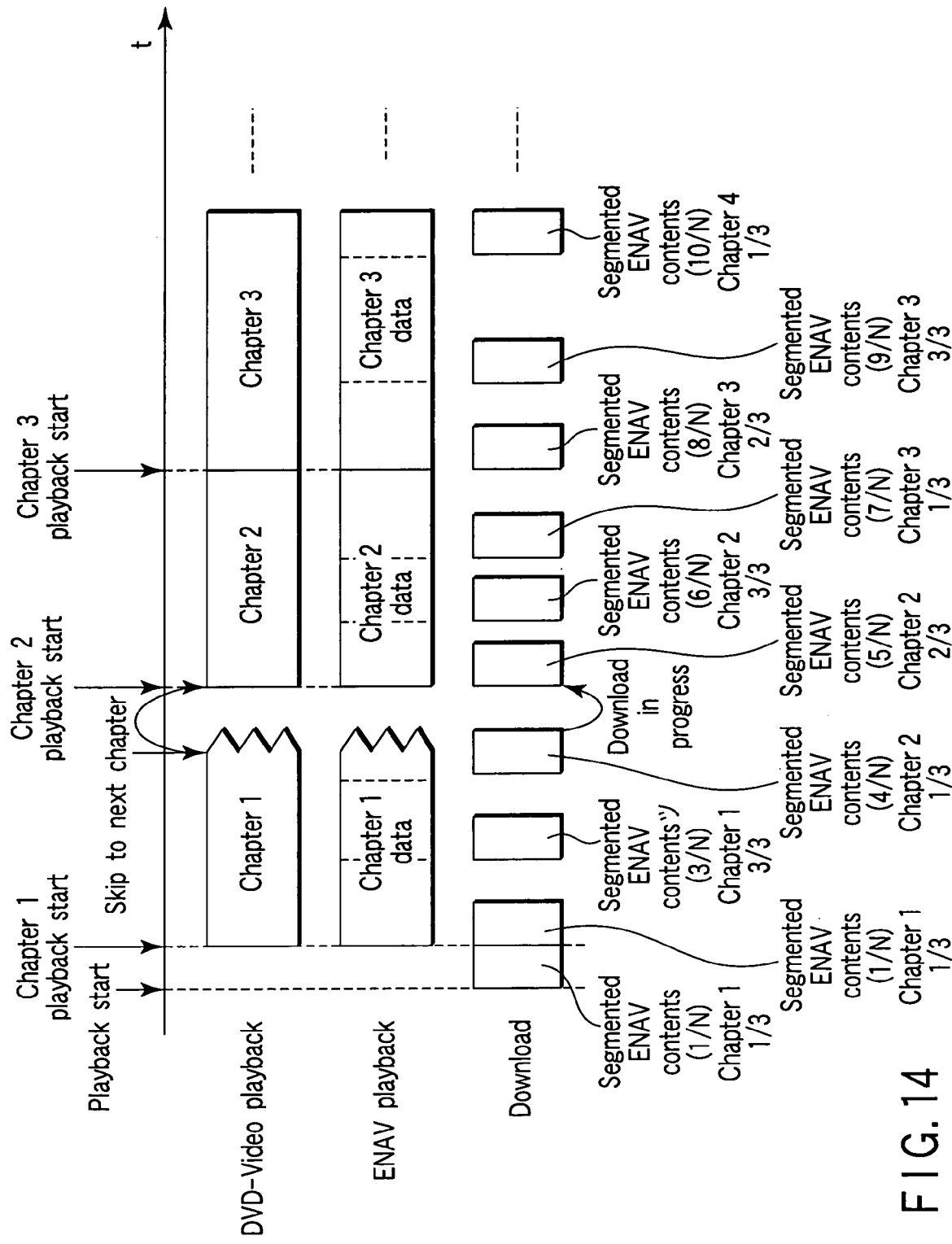
F I G. 14

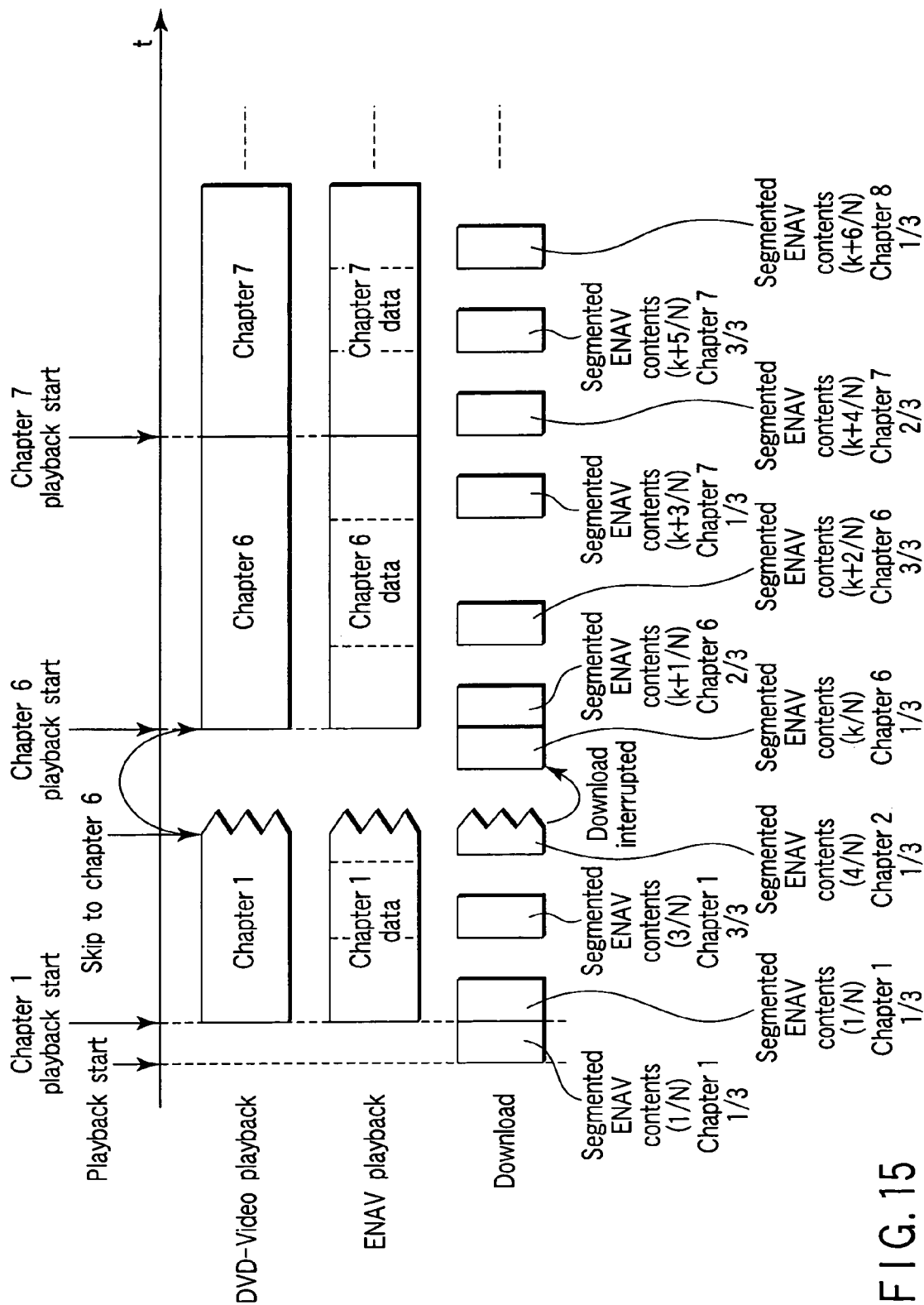
F I G. 15

INFORMATION PLAYBACK APPARATUS HAVING EXPANSION INFORMATION STORAGE UNIT AND INFORMATION PLAYBACK METHOD

CROSS-REFERENCE TO RELATED APPLICATIONS

This application is based upon and claims the benefit of priority from the prior Japanese Patent Application No. 2002-357120, filed Dec. 9, 2002, the entire contents of which are incorporated herein by reference.

BACKGROUND OF THE INVENTION

1. Field of the Invention

The present invention relates to an information playback apparatus and information playback method for playing back contents stored in an information storage medium.

2. Description of the Related Art

In recent years, the standard for a read-only DVD (Digital Versatile Disk) has been specified, and playback apparatus that play back video/audio information stored in read-only DVDs are commercially available.

According to the read-only DVD standard, the read-only DVD stores presentation data which records actual video and audio data, and navigation data used to manage the presentation data. The presentation data contains video data, audio data, and sub-picture data, which are multiplexed according to the specification of a program stream (2048 bytes) specified by MPEG2. The navigation data describes PGCs (Pro-Gram Chains) and Cells, which set a time configuration and order of video and audio data to be played back. With this navigation data, multi-angle, multi-story, and parental functions can be implemented.

As a prior art associated with the above technique, an image display apparatus which provides a service that integrates a DVD-Video title and HTML file has been disclosed in Jpn. Pat. Appln. KOKAI Publication No. 11-161663. This image display apparatus extracts a URL from a navigation pack in a video object unit, and establishes connection to the Internet based on the extracted URL, so as to display data in conjunction with a scene to be played back.

According to the read-only DVD standard, only an MPEG2 program stream recorded on a disk can be played back, and information other than the MPEG2 program stream recorded on the disk cannot be played back. That is, the expandability of DVD playback is poor.

In general, the readout speed of information from a DVD is higher than the download speed of information via the Internet. That is, a given period of time is required to download information via the Internet, thus producing a certain wait time for the user. In order to solve this problem, a method of downloading all pieces of necessary information via the Internet, and then starting playback may be used. However, this method requires a large-capacity buffer for downloading, resulting an increase in cost of the apparatus.

BRIEF SUMMARY OF THE INVENTION

An information playback apparatus according to one aspect of the present invention comprises a first acquisition unit configured to acquire contents from an information storage medium, a second acquisition unit configured to acquire expansion information from at least one of the information storage medium and an external apparatus via a communication line, a storage unit configured to store the expansion information acquired by the second acquisition unit in accordance with a type of information, and a playback unit configured to play back the contents acquired by the first acquisition unit, and to play back the expansion information stored in the storage unit in synchronism with playback of the contents.

An information playback method according to one aspect of the present invention comprises: acquiring expansion information from at least one of an information storage medium and an external apparatus via a communication line; storing, in a storage unit, the expansion information in accordance with a type of information; and playing back the contents acquired from the information storage medium, and playing back the expansion information stored in the storage unit in synchronism with playback of the contents.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 4 is a diagram for explaining an example of a schematic arrangement and operation of a preload/download buffer unit adopted in the DVD playback apparatus shown in FIG. 3;

FIG. 12 shows an example of the data structure of ENAV contents;

FIG. 14 is a chart for explaining the process executed upon generation of skip to the next chapter when segmented ENAV contents are played back while being downloaded;

FIG. 15 is a chart for explaining the process executed upon generation of skip to an arbitrary chapter when segmented ENAV contents are played back while being downloaded;

DETAILED DESCRIPTION OF THE INVENTION

A preferred embodiment of the present invention will be described hereinafter with reference to the accompanying drawings.

The data structure of a disk which considers compatibility to the DVD-Video standard will be explained first.

Figure 1:
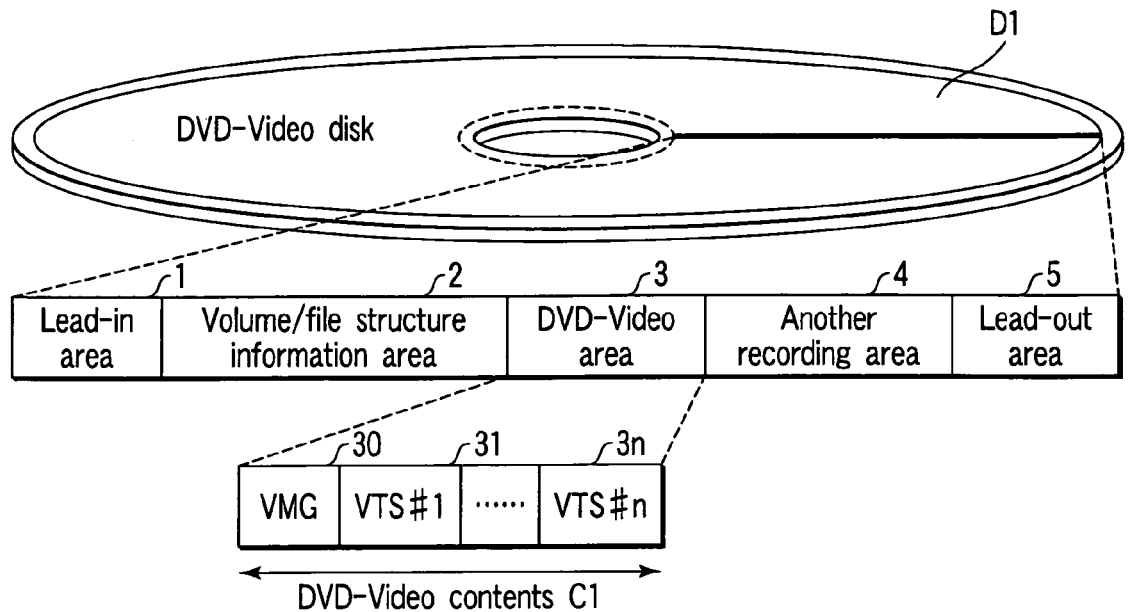
FIG. 1 shows an example of the data structure of a DVD-Video disk.
Figure 2:
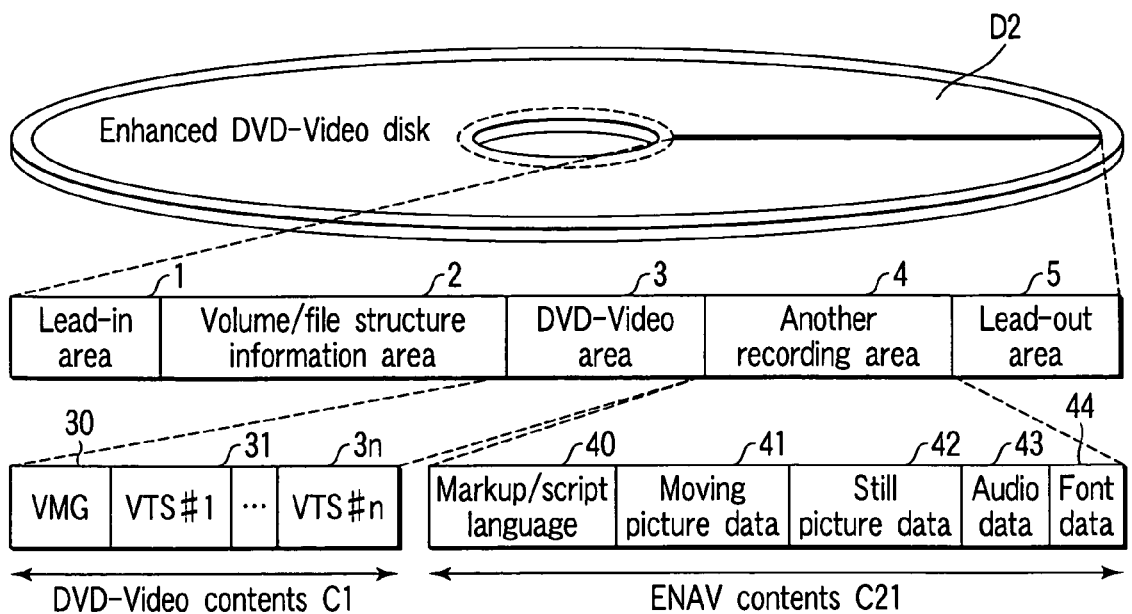
FIG. 2 shows an example of the data structure of an enhanced DVD-Video disk.

FIGS. 1 and 2 show examples of the data structures of DVD-Video disks which can be played back by a DVD-Video player shown in FIG. 3 (to be described later).

FIG. 1 shows an example of the data structure of a standard DVD-Video disk D1. A DVD-Video area 3 of the standard DVD-Video disk D1 stores DVD-Video contents C1 (having an MPEG2 program stream structure).

On the other hand, FIG. 2 shows the data structure of an enhanced DVD-Video disk D2. A DVD-Video area 3 of the enhanced DVD-Video disk D2 stores DVD-Video contents C1 (having an MPEG2 program stream structure) having the same data structure as the DVD-Video standard. Furthermore, another recording area 4 of the enhanced DVD-Video disk D2 stores enhanced navigation (to be abbreviated as ENAV hereinafter) contents C21 which allows a wide variety of playback of video contents. Note that the presence of the recording area 4 is also accepted in the DVD-Video standard.

The basic data structure of a DVD-Video disk will be explained below. The recording area of the DVD-Video disk includes a lead-in area 1, volume space, and lead-out area 5 in turn from its inner periphery. The volume space contains a volume/file structure information area 2, and DVD-Video area (DVD-Video zone) 3, and can also have another recording area (DVD other zone) 4 as an option.

The volume/file structure information area 2 is assigned for a UDF (Universal Disk Format) bridge. The volume of the UDF bridge format is recognized according to ISO/IEC13346 Part 2. A space that recognizes this volume consists of successive sectors, and starts from the first logical sector of the volume space in FIGS. 1 and 2. First 16 logical sectors are reserved for system use specified by ISO9660. In order to assure compatibility to the conventional DVD-Video standard, the volume/file structure information area 2 with such contents is required.

The DVD-Video area 3 records management information called video manager VMG 30 and one or more video contents called video title sets VTS (VTS#1 to VTS#n). The VMG 30 is management information for all VTSs present in the DVD-Video area 3, and contains control data VMGI, VMG menu data VMGM_VOBS (option), and VMG backup data. Each VTS contains control data VTSI of that VTS, VTS menu data VTSM_VOBS (option), data VTSTT_VOBS of the contents (movie or the like) of that VTS (title), and VTSI backup data. To assure compatibility to the conventional DVD-Video standard, the DVD-Video area with such contents is also required.

A playback select menu or the like of each title (VTS#1 to VTS#n) is given in advance by a provider (the producer of a DVD video disk) using the VMG, and a playback chapter select menu, the playback order of recorded contents (cells), and the like in a specific title (e.g., VTS#1) are given in advance by the provider using the VTSI. Therefore, the viewer of the disk (the user of the DVD-Video player) can enjoy the recorded contents of that disk in accordance with menus of the VMG/VTSI prepared in advance by the provider and playback control information (program chain information PGCI) in the VTSI. However, with the DVD-Video standard, the viewer (user) cannot play back the contents (movie or music) of each VTS by a method different from the VMG/VTSI prepared by the provider.

The enhanced DVD-Video disk D2 shown in FIG. 2 is prepared for a mechanism that allows the user to play back the contents (movie or music) of each VTS by a method different from the VMG/VTSI prepared by the provider, and to play back while adding contents different from the VMG/VTSI prepared by the provider. The ENAV contents C21 contained in this disk D2 cannot be accessed by a DVD-Video player which is manufactured on the basis of the conventional DVD-Video standard (even if the ENAV contents can be accessed, their contents cannot be used). However, a DVD-Video player (player in FIG. 3 or the like) can access the ENAV contents C21, and can use their playback contents.

The ENAV contents C21 (C22) are configured to contain audio data, still picture data, font/text data, moving picture data, animation data, and the like, and also an ENAV document (described in a Markup/Script language) as information for controlling playback of these data. This playback control information describes, using a Markup language or Script language, playback methods (display method, playback order, playback switch sequence, selection of data to be played back, and the like) of the ENAV contents (consisting of audio, still picture, font/text, moving picture, animation, and the like) and/or the DVD-Video contents C1. For example, Markup languages such as HTML (Hyper Text Markup Language)/XHTML (eXtensible Hyper Text Markup Language), SMIL (Synchronized Multimedia Integration Language), and the like, Script languages such as an ECMA (European Computer Manufacturers Association) script, JavaScript, and the like, and so forth, may be used in combination.

Since the contents of the enhanced DVD-Video disk D2 in FIG. 2 except for the other recording area comply with the DVD-Video standard, video contents recorded on the DVD-Video area can be played back using an already prevalent DVD-Video player (i.e., this disk is compatible to the conventional DVD-Video disk D1).

The ENAV contents C21 recorded on the other recording area cannot be played back (or used) by the conventional DVD-Video player but can be played back and used by a DVD-Video player (FIG. 3) according to an embodiment of the present invention. Therefore, when the ENAV contents C21 (and also ENAV contents C22) are played back using the DVD-Video player according to an embodiment of the present invention, the user can enjoy not only the contents of the VMG/VTSI prepared in advance by the provider but also a variety of video playback features.

Figure 3:
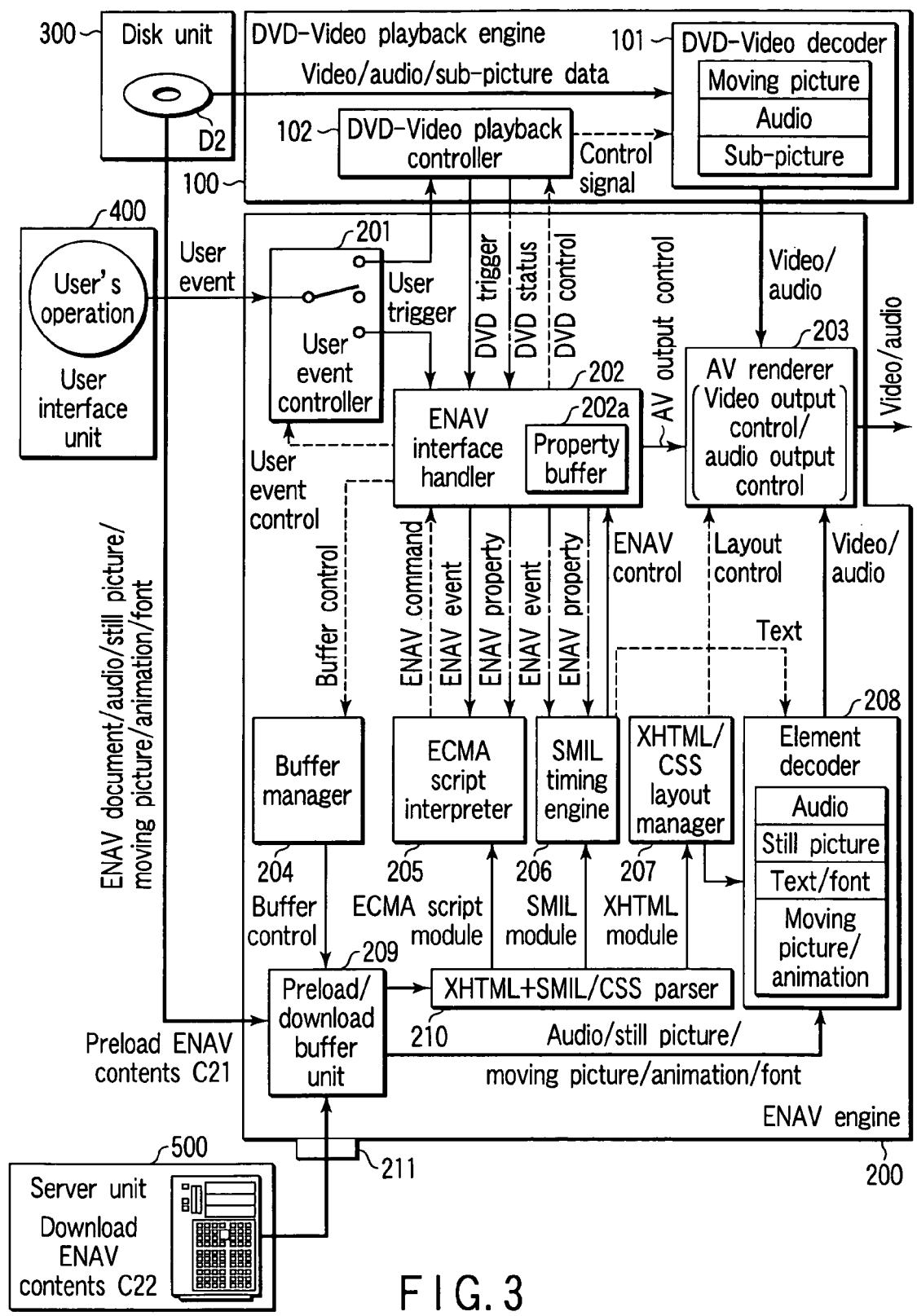
FIG. 3 is a block diagram showing an example of a DVD playback apparatus (information playback apparatus)

FIG. 3 shows an example of a DVD-Video player used to play back an enhanced DVD-Video disk (FIG. 2) according to the embodiment of the present invention. This DVD-Video player plays back and processes recorded contents (DVD- Video contents C1 and/or ENAV contents C21) from the enhanced DVD-Video disk D2 (FIG. 2) which is compatible to the DVD-Video standard, and downloads and processes ENAV contents C22 via a communication line such as the Internet or the like. Note that the ENAV contents C21 are first expansion information, and the ENAV contents C22 are second expansion information.

Note that ENAV contents C21 and C22 are one type of expansion information.

The DVD-Video player shown in FIG. 3 comprises a DVD-Video playback engine 100, ENAV engine 200, disk unit 300, and user interface unit 400. The DVD-Video playback engine 100 plays back and processes an MPEG2 program stream (DVD-Video contents C1) recorded on the disk D2. The ENAV engine 200 plays back and processes the ENAV contents C21 and C22. The disk unit 300 reads out the DVD-Video contents C1 and/or ENAV contents C21 recorded on the disk D2. The user interface unit 400 transmits inputs (user's operations) by the user of the player as user events.

The ENAV engine 200 comprises an Internet connection unit 211. The Internet connection unit 211 serves as a communication means used to establish connection to a communication line such as the Internet or the like. Furthermore, the ENAV engine 200 comprises preload/download buffer unit 209, XHTML+SMIL/CSS parser 210, XHTML/CSS layout manager 207, ECMA Script interpreter 205, SMIL timing engine 206, ENAV interface handler 202, user event controller 201, element decoder 208, AV renderer 203, and buffer manager 204.

In the block arrangement shown in FIG. 3, a DVD-Video playback controller 102, a DVD-Video decoder 101, the user event controller 201, the ENAV interface handler 202, the XHTML+SMIL/CSS parser 210, the ECMA Script interpreter 205, the SMIL timing engine 206, the XHTML/CSS layout manager 207, the AV renderer 203, the element decoder 208, the buffer manager 204, and the like can be implemented by a microcomputer (and/or hardware logic) which serves as functions of the respective blocks by an installed program (firmware; not shown). A work area used upon executing this firmware can be assured on a semiconductor memory (and a hard disk as needed; not shown) in the respective blocks.

The DVD-Video playback engine 100 is a device for playing back the DVD-Video contents C1 based on the existing DVD-Video standard, and includes the DVD-Video decoder 101 which decodes the DVD-Video contents C1 loaded by the disk unit 300, and the DVD-Video playback controller 102 which makes playback control of the DVD-Video contents C1.

The DVD-Video decoder 101 has a function of decoding video data, audio data, and sub-picture data based on the existing DVD-Video standard, and outputting the decoded video data (mixed data of the aforementioned video and sub-picture data) and audio data, respectively. With this function, the DVD-Video playback engine 100 has the same function as that of a playback engine of a normal DVD-Video player, which is manufactured based on the existing DVD-Video standard. That is, the player shown in FIG. 3 can play back video data, audio data, and the like of an MPEG2 program stream as in a normal DVD-Video player, and can play back an existing DVD-Video disk (complying with the conventional DVD-Video standard) D1.

In addition, the DVD-Video playback controller 102 can also control playback of the DVD-Video contents C1 in accordance with a "DVD control" signal output from the ENAV engine 200. More specifically, if an arbitrary event (e.g., menu call or title jump) has occurred in the DVD-Video playback engine 100 in a DVD-Video playback mode, the DVD-Video playback controller 102 can output a "DVD trigger" signal indicating the playback status of the DVD-Video contents C1 to the ENAV engine 200. In this case (simultaneously with output of the DVD trigger signal or at an appropriate timing before and after the output), the DVD-Video playback controller 102 can output a "DVD status" signal indicating property information (e.g., an audio language, sub-picture subtitle language, playback operation, playback position, various kinds of time information, disk contents, and the like set in the player) of the DVD-Video player to the ENAV engine 200.

The user event controller 201 makes control based on user's operations, and receives "user events" corresponding to user's operations (menu call, title jump, play start, play stop, play pause, etc.) from the user interface unit 400. After that, the user event controller 201 executes one of the following processes on the basis of a "user event control" signal sent from the ENAV interface handler 202.

1. The controller 201 transmits a "user trigger" signal to the ENAV interface handler 202.

2. The controller 201 transmits a "user trigger" signal to the DVD-Video playback controller 102.

3. The controller 201 inhibits a user event (since, for example, a DVD-Video playback process that is not designed by the contents provider may be made).

At this time, the aforementioned "user event control" signal specifically executes, e.g., the following control.

1. When video data of the DVD-Video playback engine 100 is to be output from the AV renderer 203, the user event signal is directly transmitted to the DVD-Video playback engine 100 as a user trigger signal. In this case, the user's operation is the same as that in a normal DVD-Video playback mode.

2. When video data of the ENAV engine 200 is to be output from the AV renderer 203, or when video data of the DVD-Video playback engine 100 and that of the ENAV engine 200 are to be mixed and simultaneously output by the AV renderer 203, the following control is made.

2-1. When the user event signal is output to the ENAV interface handler 202 as a user trigger signal, the ENAV interface handler 202 outputs a function call corresponding to that event (menu call or the like) to the DVD-Video playback controller 102 of the DVD-Video playback engine 100 as a DVD control signal.

2-2. When a DVD-Video playback process which is not designed by the system (e.g., a playback method that the currently active DVD-Video playback engine 100 cannot cope with, or an operation inhibited by user operation control UOP specified by the current DVD standard) may be made, transmission of the user event signal is blocked (inhibited or blocked).

Note that the contents of the user event signal (user trigger signal) transmitted to the ENAV interface handler 202 may be transmitted to the AV renderer 203 as an "AV output control" signal. As a result, for example, when the user has changed the contents or window size or has shifted its display position using a cursor key of a remote controller (not shown), this operation is sent from the user event controller 201 to the ENAV interface handler 202 as a user trigger signal, which is output to the AV renderer 203 as a corresponding AV output control signal. In addition, when a user event indicating switching between a video/audio output from the DVD-Video playback engine 100 and that from the ENAV engine 200 is sent to the AV renderer 203, the video/audio output can be switched in response to user's operation.

The ENAV interface handler 202 exchanges a "DVD status" signal, "DVD trigger" signal, and/or "DVD control" signal with the DVD-Video playback controller 102, or exchanges a "user trigger" signal and/or "user event control" signal with the user event controller 201. Furthermore, the ENAV interface handler 202 exchanges an "ENAV event", "ENAV property", "ENAV command", and "ENAV control" signal with the ECMA Script interpreter 205 and SMIL timing engine 206. More specifically, the ENAV interface handler 202 executes the following processes.

1. The handler 202 transmits a "DVD trigger" signal which is received from the DVD-Video playback engine 100 and indicates the operation of the DVD-Video playback engine 100, or a "user trigger" which is received from the user event controller 201 and indicates the user's operation to the ECMA Script interpreter 205 and SMIL timing engine 206 as an "ENAV event".

2. The handler 202 transmits a "DVD status" signal which is received from the DVD-Video playback engine 100 and indicates the playback status of the DVD-Video playback engine 100 to the ECMA Script interpreter 205 and SMIL timing engine 206 as an "ENAV property event". At this time, DVD status information is saved in a property buffer 202a of the ENAV interface handler 202 as needed.

3. The handler 202 transmits an "ENAV control" signal from the SMIL timing engine 206 to the DVD-Video playback engine 100 as a "DVD control" signal.

4. The handler 202 outputs a "user event control" signal used to switch a user event to the user event controller 201, a "DVD control" signal used to control playback of the DVD-Video playback engine 100 to the DVD-Video playback engine 100, an "AV output control" signal used to switch video and audio data to the AV renderer 203, and a "buffer control" signal used to load/erase the contents of the buffer to the buffer manager 204, in accordance with the contents of an "ENAV control" signal from the ECMA Script Interpreter 205.

That is, the ENAV interface handler 202 has a function of parsing and interpreting ENAV contents, and then converting control signals and the like between the DVD-Video playback engine 100 and ENAV engine 200.

The ENAV interface handler 202 is configured to exchange a first signal and to exchange a second signal on the basis of the contents which are parsed by the XHTML+SMIL/CSS parser 210 and are interpreted by the ECMA Script interpreter 205 and SMIL timing engine 206, or a user event from an input device. In other words, the ENAV interface handler 202 controls the output states of video and audio signals by the AV renderer 203 on the basis of at least one of the first signal exchanged with the DVD-Video playback controller 102, and the second signal exchanged with the ECMA Script interpreter 205 and SMIL timing engine 206. The first signal pertains to the playback status of the DVD-Video disk D2, and corresponds to the "DVD control" signal, "DVD trigger" signal, "DVD status" signal, and the like. The second signal pertains to the contents of the ENAV contents, and corresponds to the "ENAV event" signal, "ENAV command" signal, "ENAV property" signal, "ENAV control" signal, and the like.

Generally speaking, the XHTML+SMIL/CSS parser 210 parses an ENAV document indicating playback control information, which is contained in the ENAV contents C21 acquired from the DVD-Video disk D2 or the ENAV contents C22 acquired from the Internet or the like. The ENAV document is made up of a combination of Markup languages such as HTML/XHTML, SMIL, and the like, and Script languages such as ECMA Script, JavaScript, and the like, as described above. The XHTML+SMIL/CSS parser 210 has a function of transmitting an ECMA Script module to the ECMA Script interpreter 205, SMIL module to the SMIL timing engine 206, and XHTML module to the XHTML/CSS layout manager 207 in accordance with the parsing result.

The ECMA Script interpreter 205 interprets the aforementioned ECMA Script module and follows its instruction. That is, the ECMA Script interpreter 205 has a function of issuing an "ENAV command" signal to the ENAV interface handler 202 in correspondence with an "ENAV event" signal sent from the ENAV interface handler 202 or an "ENAV property" signal read from the property buffer of the ENAV interface handler 202.

The SMIL timing engine 206 interprets the aforementioned SMIL module and follows its instruction. That is, the SMIL timing engine 206 has a function of issuing an "ENAV control" signal to the ENAV interface handler 202 or element decoder 208 in correspondence with an "ENAV event" signal sent from the ENAV interface handler 202 or an "ENAV property" signal read from the property buffer of the ENAV interface handler 202 at a designated timing (in accordance with a time measured in the ENAV engine). With this function, control of the DVD-Video playback engine 100 and playback of video data (moving picture, still picture, animation) and audio data can be achieved at a desired timing.

The XHTML/CSS layout manager 207 interprets the aforementioned XHTML module and follows its instruction. That is, the XHTML/CSS layout manager 207 outputs a "layout control" signal to the AV renderer. The "layout control" signal contains information associated with the size and position of a video window to be output (this information often contains information associated with a display time such as display start, end, or continue), and information associated with the level of audio data to be output (this information often contains information associated with an output time such as output start, end, or continue). Also, text information to be displayed, which is contained in the XHTML module, is sent to the element decoder 208, and is decoded and displayed using desired font data.

Practical methods of parsing and interpreting Markup and Script languages can adopt the same methods as parsing/interpretation in state-of-the-art techniques such as HTML/XHTML, SMIL, and the like or ECMA Script, JavaScript, and the like (the hardware used is the microcomputer that has been mentioned at the beginning of the description of FIG. 3). Note that commands and variables described in Scripts are different since objects to be controlled are different. The ENAV document used upon practicing the present invention uses unique commands and variables associated with playback of the DVD-Video disk D2 and/or the ENAV contents C21 or C22. For example, a command that switches the playback contents of the DVD-Video disk D2 or the ENAV contents C21 or C22 in response to a given event is unique to a Markup or Script language in the ENAV document.

As another example of commands and variables unique to a Markup or Script language in the ENAV document, those which are used to change the video size from the DVD-Video playback engine 100 and/or ENAV engine 200 and to change the layout of that video data are available. A change in video size is designated using a size change command and a variable that designates the size after change. A change in video layout is designated by a display position change command and a variable that designates the coordinate position or the like after change. When objects to be displayed overlap on the screen, a variable that designates depth ordering is added. Also, commands and variables used to change the audio level from the DVD-Video playback engine 100 and/or ENAV engine 200 or to select an audio language to be used are available. A change in audio level is designated by an audio level change command and a variable that designates an audio level after change. An audio language to be used is selected by an audio language change command and a variable that designates the type of language after change. Furthermore, commands and variables used to control user events in the user event controller 201 are available.

On the basis of the commands/variables of the Markup and Script languages in the ENAV document, as exemplified above, a "layout control" signal is sent from the XHTML/CSS layout manager (some functions are often implemented by the SMIL timing engine 206) to the AV renderer 203. The "layout control" signal controls the layout on the screen, size, output timing, and output time of video data to be displayed on, e.g., an external monitor device or the like (not shown), and/or the tone volume, output timing, and output time of audio data to be played back from an external loudspeaker (not shown).

The element decoder 208 decodes ENAV contents data such as audio data, still picture data, text/font data, moving picture data, animation data, and the like contained in the ENAV contents C21 or C22. That is, the element decoder 208 includes an audio decoder, still picture decoder, text/font decoder, and moving picture decoder in correspondence with objects to be decoded. For example, audio data in the ENAV contents, which is encoded by, e.g., MPEG or AC-3, is decoded by the audio decoder and is converted into non-compressed audio data. Still picture data, which is encoded by JPEG, GIF, or PNG, is decoded by the still picture decoder, and is converted into non-compressed image data. Likewise, moving picture/animation data, which is encoded by MPEG2, MPEG4, or MacromediaFlash, is decoded by the moving picture/animation decoder, and is converted into non-compressed moving picture data. Text data contained in the ENAV contents is decoded by the text/font decoder using font data contained in the ENAV contents, and is converted into text image data which can be superimposed on a moving or still picture. Video/audio data, which contains these decoded audio data, image data, moving picture data, and text image data as needed, is sent from the element decoder 208 to the AV renderer 203.

The AV renderer 203 has a function of controlling a video/output output. More specifically, the AV renderer 203 controls, e.g., the video display position and size (often including the display timing and display time together), and the audio level (often including the output timing and output time together) in accordance with the "layout control" signal output from the XHTML/CSS layout manager 207. The video/output outputs to be controlled are those from the DVD-Video playback engine 100 and element decoder 208. Furthermore, the AV renderer 203 has a function of controlling mixing and switching of the DVD-Video contents C1 and ENAV contents C21 or C22 in accordance with an "AV output control" signal output from the ENAV interface handler 202.

Note that the ENAV engine 200 in the DVD-Video player in FIG. 3 comprises an interface for sending the ENAV document in the ENAV contents C21 read from the DVD-Video disk D2 to the XHTML+SMIL/CSS parser 210 via the preload/download buffer unit 209, and an interface for sending data (audio data, still picture data, text/font data, moving picture data, and the like) in the read ENAV contents C21 to the element decoder 208 via the preload/download buffer unit 209. These interfaces form an interface (first interface) independent from the Internet connection unit 211 in FIG. 3.

The DVD-Video player in FIG. 3 comprises an interface for receiving the ENAV contents C22 from a communication line such as the Internet or the like, and sending the ENAV document in the received ENAV contents C22 to the XHTML+SMIL/CSS parser 210 via the preload/download buffer unit 209, and an interface for sending data (audio data, still picture data, text/font data, moving picture data, and the like) in the received ENAV contents C22 to the element decoder 208 via the preload/download buffer unit 209. These interfaces form the Internet connection unit (second interface) shown in FIG. 3.

The preload/download buffer unit 209 comprises buffers used to store the ENAV contents C22 downloaded from the server unit 500, and to store the ENAV contents C21 loaded from the enhanced DVD-Video disk D2 by the disk unit 300.

The preload/download buffer unit 209 reads the ENAV contents C22 on an external server (server unit 500) under the control of the buffer manager 204 based on the markup/script language, and downloads the ENAV contents C22 via the Internet connection unit 211.

The preload/download buffer unit 209 loads the ENAV contents C21 recorded on the enhanced DVD-Video disk D2 under the control of the buffer manager 204 based on the markup/script language. At this time, if the disk unit 300 is a device that can access the disk at high speed, it can read out the ENAV contents C21 from the enhanced DVD-Video disk D2 while playing back the DVD-Video contents C1, i.e., reading out DVD-Video data from the enhanced DVD-Video disk D2. If the disk unit 300 is not a device that can make high-speed access, or if the playback operation of the DVD-Video contents C1 is to be perfectly guaranteed, playback of the DVD-Video contents C1 must not be interrupted. In such case, the ENAV contents C21 are read out from the enhanced DVD-Video disk D2 and are stored in the preload/download buffer unit 209 in advance prior to the beginning of playback. In this way, since the ENAV contents C21 are read out from the preload/download buffer unit 209 simultaneously when the DVD-Video contents C1 are read out from the enhanced DVD-Video disk D2, the load on the disk unit 300 can be reduced. Hence, the DVD-Video contents C1 and ENAV contents can be simultaneously played back without interrupting playback of the DVD-Video contents C1.

In this way, when the ENAV contents C22 downloaded from the external server (server unit 500) are stored in the preload/download buffer unit 209 in the same manner as the ENAV contents C21 recorded on the enhanced DVD-Video disk D2, the DVD-Video contents C1 and ENAV contents C22 can be simultaneously read out and played back.

The preload/download buffer unit 209 has a limited storage capacity. That is, the data size of ENAV contents C21 or C22 that can be stored in the preload/download buffer unit 209 is limited. For this reason, it is possible to erase ENAV contents C21 or C22 with low necessity and to save those with high necessity under the control of the buffer manager 204 (buffer control). Such save control and erase control may be automatically executed by the preload/download buffer unit 209.

The buffer manager 204 can send the following instructions as "buffer control" to the preload/download buffer unit 209 in accordance with an instruction of the ENAV document.

load a specific file or a part of file from a server (download)

load a specific file or a part of file from a disk (preload)

erase a specific file or a part of file from a buffer

The building components of the ENAV engine in FIG. 3 can also be summarized as follows. That is, the ENAV engine comprises:

XHTML+SMIL/CSS parser 210

The XHTML+SMIL/CSS parser 210 parses the contents of the ENAV documents.

ECMA Script Interpreter 205, SMIL timing engine 206, XHTML/CSS layout manager 207

The ECMA Script Interpreter 205, SMIL timing engine 206, and XHTML/CSS layout manager 207 respectively interpret the parsed modules.

ENAV interface handler 202

The ENAV interface handler 202 handles control signals from the ECMA Script Interpreter 205 and SMIL timing engine 206, and those from the DVD-Video playback controller 102.

Element decoder 208

The element decoder 208 generates video/audio data corresponding to audio data, still picture data, text/font data, moving picture data, and the like contained in the ENAV contents C21 or C22.

AV renderer 203

The AV renderer 203 outputs data obtained by mixing video/audio data generated by the element decoder 208 to that played back by the DVD-Video playback engine 100 on the basis of the execution result of the ENAV command in the ENAV interface handler 202. Or the AV handler 203 selectively outputs one of video/audio data generated by the element decoder 208 and that played back by the DVD-Video playback engine 100 on the basis of the execution result of the ENAV command in the ENAV interface handler 202.

User event controller 201

The user event controller 201 generates user events corresponding to user's operations.

Preload/download buffer unit 209

The preload/download buffer unit 209 temporarily stores the ENAV contents C22 acquired from the disk unit 300 or from the server unit 500 via the Internet connection unit 211.

Buffer manager 204

The buffer manager 204 loads or erases ENAV contents data to or from the preload/download buffer unit 209 in accordance with an instruction from the ENAV interface handler 202 (i.e., an instruction of the ENAV document).

The ENAV interface handler 202 is configured to execute a process corresponding to a user event generated by the user event controller 201. The AV renderer 203 is configured to output data obtained by mixing video/audio data generated by the element decoder 208 to that played back by the DVD-Video playback engine 100 on the basis of the execution result of the ENAV command in the ENAV interface handler 202. Or the AV handler 203 is configured to selectively output one of video/audio data generated by the element decoder 208 and that played back by the DVD-Video playback engine 100 on the basis of the execution result of the ENAV command in the ENAV interface handler 202.

FIG. 4 is a schematic diagram showing an example of the preload/download buffer unit 209.

For example, the preload/download buffer unit 209 comprises a still picture buffer 2091, animation/moving picture buffer 2092, audio commentary buffer 2093, audio buffer 2094, effect sound buffer 2095, font buffer 2096, and ENAV document buffer 2097.

The still picture buffer 2091 stores still picture data contained in the ENAV contents C21 or C22. The animation/moving picture buffer 2092 stores animation/moving picture data contained in the ENAV contents C21 or C22. The audio commentary buffer 2093 stores audio commentary data. The audio buffer 2094 stores audio data. The effect sound buffer 2095 stores effect sound data. The font buffer 2096 stores font data. The ENAV document buffer 2097 stores an ENAV document.

That is, the preload/download buffer unit 209 buffers given data in a predetermined buffer in accordance with the type of data contained in ENAV contents.

The element decoder 208 comprises s still picture decoder 2081, animation/moving picture decoder 2082, audio decoder 2083, and text/font decoder 2084. The still picture decoder 2081 decodes still picture data stored in the still picture buffer 2091. The animation/moving picture decoder 2082 decodes animation/moving picture data stored in the animation/moving picture buffer 2092. The audio decoder 2083 decodes audio commentary data stored in the audio commentary buffer 2093, audio data stored in the audio buffer 2094, and effect sound data stored in the effect sound buffer 2095. The text/font decoder 2084 decodes text/font data stored in the font buffer 2096.

The AV renderer 203 outputs the still picture data, animation/moving picture data, audio data, and text/font data decoded by these decoders as video and audio data.

Audio commentary data will be explained below. The audio commentary data indicates audio data to be synchronized with all or a part of the DVD-Video contents C1. For example, the audio commentary data is used in substitution of audio data recorded on the DVD-Video disk D2, mixing to audio data recorded on the DVD-Video disk D2, and the like. Substitution of audio data is to substitute English audio data recorded on the DVD-Video disk D2 by Japanese audio data. Mixing to audio data is to add a comment of a director to audio data of a movie of a movie title on the DVD-Video disk D2.

The effect sound data indicates audio data of click tones, alarm tones, and the like. The audio data indicates audio data other than the audio commentary data and effect sound data, i.e., audio data of music clips, background music, and the like.

For example, even during playback of audio commentary data in synchronism with playback of a DVD title recorded on the DVD-Video disk D2, effect sounds such as alarm tones, click tones, and the like are required. That is, the audio commentary data and effect sound data are independently played back, and are output after they are mixed. The same applies to audio data such as audio clip data and the effect sound data. However, the audio commentary data and audio data such as audio clip data need not always be output at the same time.

All of the still picture buffer 2091, animation/moving picture buffer 2092, audio buffer 2094, effect sound buffer 2095, font buffer 2096, and ENAV document buffer 2097 in the preload/download buffer unit 209 have the same features and functions. That is, data in these buffers are those loaded from the enhanced DVD-Video disk D2 or server unit 500 prior to a playback request of ENAV contents. When playback of the ENAV contents is complete, and the ENAV contents need not be played back aftertime, they may be erased. In other words, required ENAV contents are loaded onto these buffers before the beginning of playback of DVD-Video or before the beginning of playback of ENAV contents. In addition, ENAV contents, which are not required, can be erased from those loaded onto these buffers, and new ENAV contents can be updated accordingly.

As shown in FIG. 4, the audio commentary buffer 2093 comprises audio buffers A and B. Data input to the audio commentary buffer 2093 is sent to either audio buffer A or B. Data output from audio buffer A or B is output from the audio commentary buffer 2093. The data input and output to and from audio buffer A or B are switched under the buffer control from the buffer manager 204. As another example, the audio commentary buffer 2093 is configured with a ring buffer. The ring buffer realizes same functions as those of the two-buffer described above. Details will be explained later.

The effects obtained upon playing back the ENAV contents C22 will be explained below with reference to FIGS. 5 to 9. That is, a case will be explained below wherein the ENAV contents C22 are played back in synchronism with the DVD-Video contents C1, while being downloaded from the external server (server unit 500) or after being downloaded temporarily.

Figure 5:
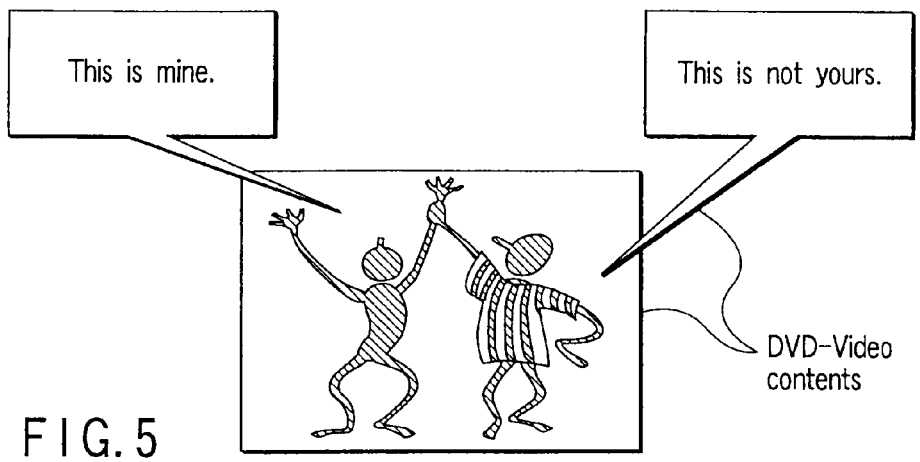
FIG. 5 shows an example of playback of DVD-Video contents alone.

An explanation will be given first with reference to FIG. 5. FIG. 5 shows playback of the DVD-Video contents C1 alone. For example, assume that a given user plays back a DVD-Video disk (enhanced DVD disk D2), but that DVD disk contains only English audio or subtitle data. If that user can understand only Japanese, it is difficult for him or her to appreciate that DVD-Video disk.

Hence, the player implements playback processes shown in FIGS. 6 to 9. That is, the player accesses the external server (server unit 500). On this external server, contents of image (moving or still picture) data with Japanese subtitle data or contents with Japanese audio data are prepared. As a method of accessing that external server, a method of specifying the external server on the basis of data on the DVD-Video disk, or a method of designating that external server by the user is available. In this way, the player can acquire contents with Japanese subtitle data or audio data by accessing the external server.

For example, the aforementioned contents for Japanese (ENAV contents C22) are downloaded from the external server (server unit 500) via the Internet connection unit 211, and are stored in the preload/download buffer unit 209. Upon completion of downloading of the full contents, they begin to be played back together with the DVD-Video contents C1. In this case, since a long download time is required, a wait time is produced accordingly until the beginning of playback of the contents. If all data are to be stored in the preload/download buffer unit 209, a buffer with a large storage capacity is required. If a buffer with a large storage capacity is prepared, and all data are stored in the preload/download buffer unit 209, the contents can be seamlessly played back irrespective of the connection state of the external server.

Alternatively, the aforementioned contents for Japanese (ENAV contents C22) are downloaded from the external server via the Internet connection unit 211, and are stored in the preload/download buffer unit 209. At the same time, already downloaded data are played back in turn together with the DVD-Video contents C1. In this case, playback of the contents can start with nearly no wait time. Furthermore, the contents data which have been played back and are not required are erased from the preload/download buffer unit 209. In this manner, the storage capacity required for the preload/download buffer unit 209 can be reduced. However, connection to the external server must be assured to attain seamless playback of the contents.

Figure 6:
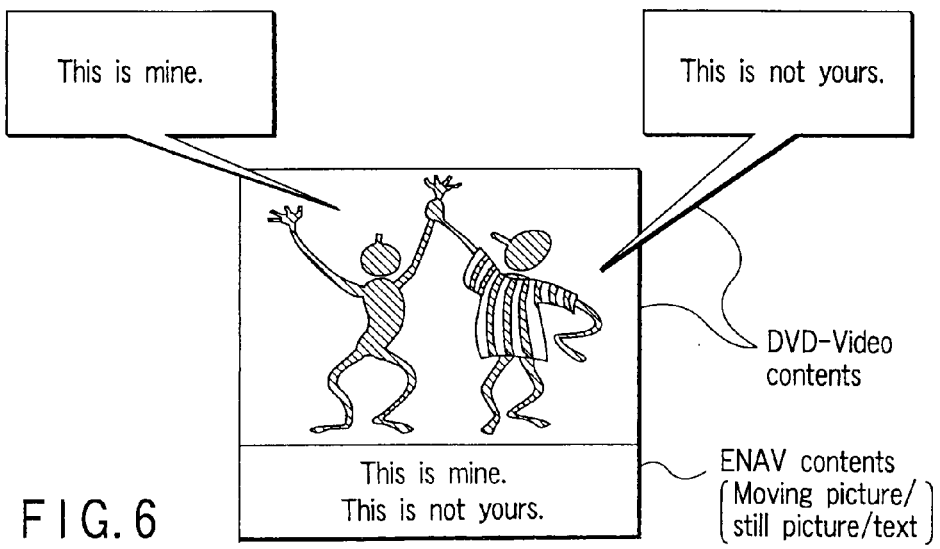
FIG. 6 shows an example of playback of DVD-Video contents and ENAV contents (moving picture, still picture, text)

A detailed explanation will be given with reference to FIG. 6. FIG. 6 shows a display example of the ENAV contents C22, which are downloaded from the external server and are required to display Japanese subtitle data, together with the DVD-Video contents C1. In order to display both the contents together, the display region of the DVD-Video contents C1 is reduced from a normal size to assure a region for displaying the ENAV contents C22 (still picture, moving picture), as shown in FIG. 6. When the ENAV contents C22 are transparent type image contents which can reflect the background, the ENAV contents C22 can be pasted on the DVD-Video contents C1 without reducing the size of the DVD-Video contents C1. In addition, when the ENAV contents C22 are made up of text and font data, text/font data rasterized by the element decoder can be pasted and displayed on the DVD-Video contents C1. When the ENAV contents C22 cannot be downloaded, display can be made using alternative image data, e.g., image data that is already loaded or image data and font data that are pre-stored in the player.

In order to achieve the video/audio output shown in FIG. 6, ENAV contents, which are made up of still picture data, and animation/moving picture data for a Japanese subtitle, are downloaded to the still picture buffer 2091 or animation/moving picture buffer 2092 in the preload/download buffer unit 209 via the Internet connection unit 211. Upon completion of downloading of all contents designated by the ENAV document, the downloaded ENAV contents begin to be played back together with the DVD-Video contents. That is, the still picture data, and animation/moving picture data are output to the element decoder 208 and are decoded. At this time, if the capacity of the download/preload buffer unit 209 is sufficiently larger than target ENAV contents, downloading is complete at a timing before playback. However, if the capacity of the download/preload buffer unit 209 is insufficient for target ENAV contents, the update process of ENAV contents is required during playback of the DVD-Video contents and ENAV contents. That is, ENAV contents, which have already been played back and are not required, must be erased, and newly required ENAV contents must be downloaded.

Figure 7:
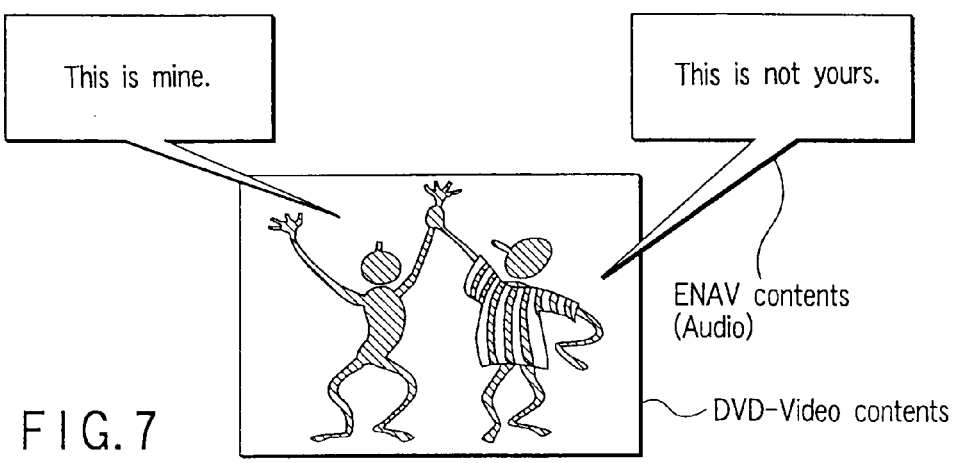
FIG. 7 shows an example of playback of DVD-Video contents and ENAV contents (audio)

Next, an explanation will be given with reference to FIG. 7. FIG. 7 shows a playback example of the ENAV contents C22 for Japanese audio, which are downloaded from the external server (the server unit 500), together with the DVD-Video contents C1. Japanese audio data of the ENAV contents C22 are played back in place of some or all audio data of the DVD-Video contents C1.

Figure 8:
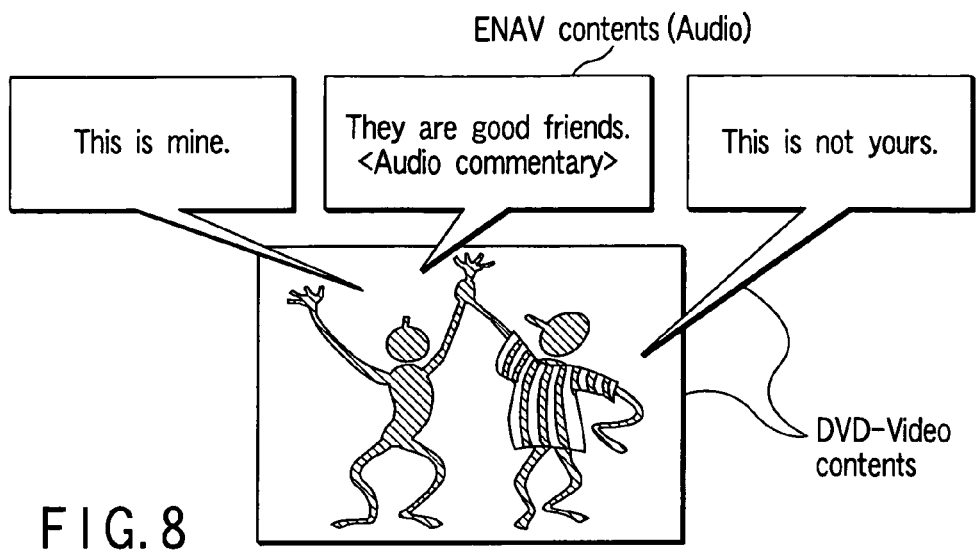
FIG. 8 shows an example of playback of DVD-Video contents and ENAV contents (audio commentary)

An explanation will be given below with reference to FIG. 8. FIG. 8 shows an example wherein ENAV contents C22 for audio commentary, which are downloaded from the external server, are played back together with the DVD-Video contents C1. The audio data of the DVD-Video contents C1 and audio commentary data of the ENAV contents C22 are played back after they are mixed. At this time, the mixing ratio upon mixing two audio data can be designated by the ENAV document.

Figure 9:
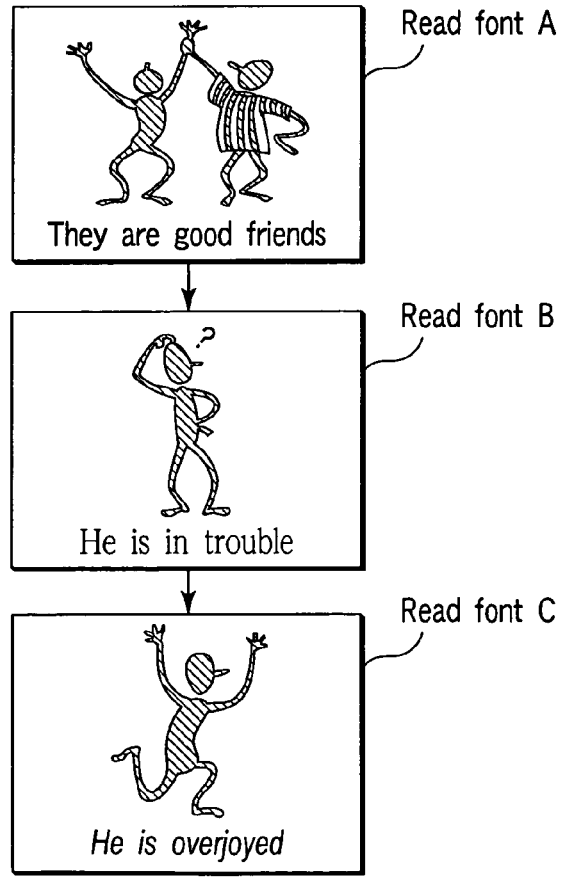
FIG. 9 shows an example of playback of DVD-Video contents and ENAV contents (font)

Subsequently, an explanation will be given with reference to FIG. 9. FIG. 9 shows an example wherein font data to be displayed changes in the middle of the ENAV contents C22 to be played back. In this example, font data used in display changes like font A→font B →font C as pages are turned. At this time, font data required to display fonts A, B, and C must be loaded by the preload/download buffer unit 209 before fonts A, B, and C are displayed. If the capacity of the preload/download buffer unit 209 is not sufficiently large, the already loaded data of font A is erased from the preload/download buffer unit 209 before font B is loaded onto the preload/download buffer unit 209, and the already loaded data of font B is erased from the preload/download buffer unit 209 before font C is loaded onto the preload/download buffer unit 209. In this manner, the insufficient capacity of the preload/download buffer unit 209 can be compensated for.

If font data cannot be loaded onto the preload/download buffer unit 209 before that font is displayed due to the connection state of the Internet or the like, display is made using an alternative font, e.g., font data that is already loaded or font data that is pre-stored in the player. Furthermore, desired font data is used as soon as the preload/download buffer unit 209 can load desired font data.

Sequences required to substitute audio data of the DVD-Video contents shown in FIG. 7 and to add audio commentary shown in FIG. 8 will be described below.

Audio data and audio commentary data (to be collectively referred to as audio commentary data or ENAV audio data hereinafter) required to substitute DVD-Video contents are synchronized with the entire DVD-Video contents. In order to load all audio commentary data onto the preload/download buffer unit 209, a buffer with a large capacity is required, and a downloading time becomes long. To avoid such situation, the audio commentary buffer, which comprises two buffers, i.e., audio buffers A and B, or a ring buffer, is used. In this way, audio commentary data can be downloaded and played back while playing back the DVD-Video contents.

Figure 10:
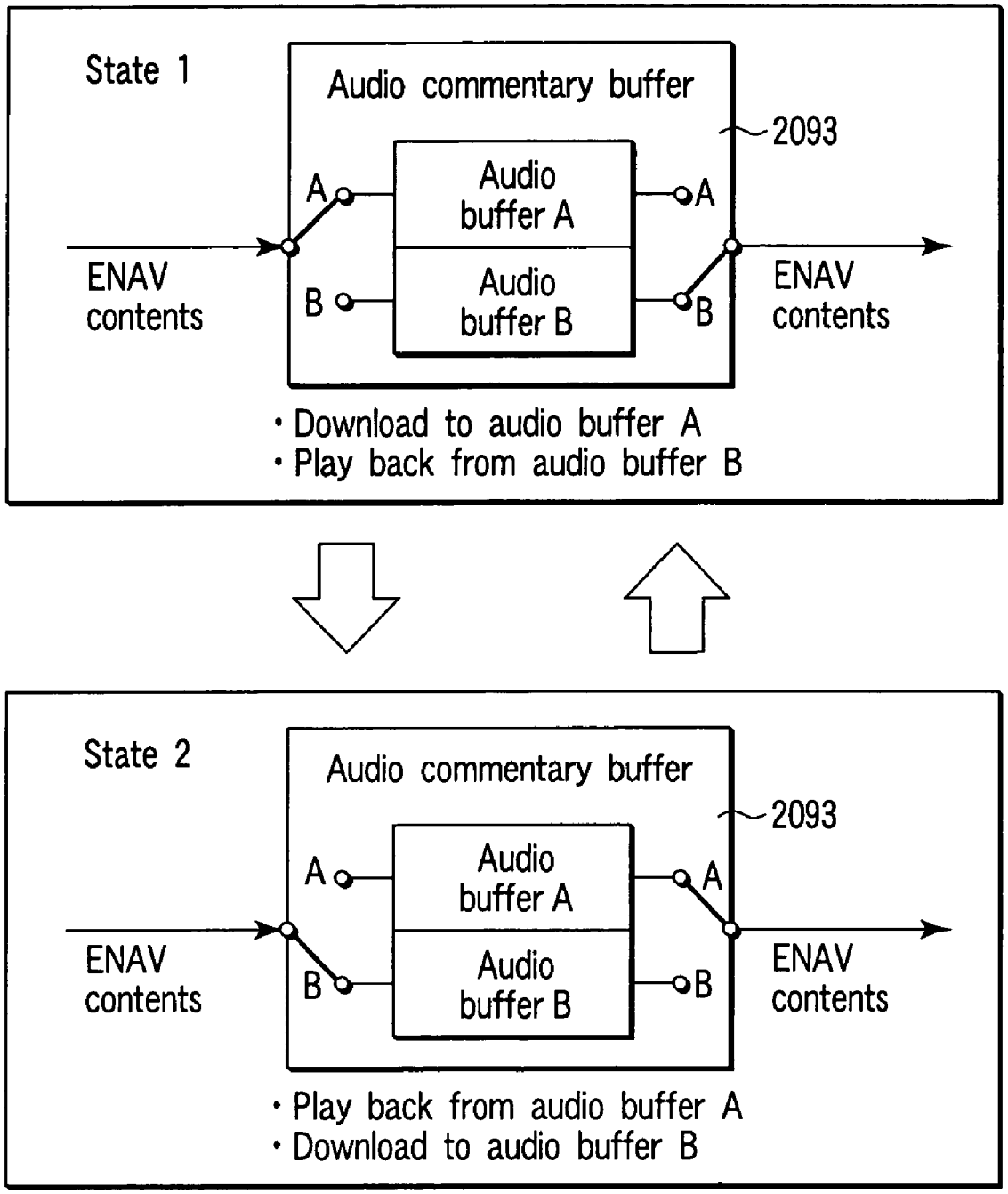
FIG. 10 is a view for explaining an outline of the operation of an audio commentary buffer.

FIG. 10 shows the function of the audio commentary buffer which comprises two buffers.

Audio commentary data provided from the server unit 500 is segmented to a size that can be sufficiently stored in audio buffer A or B. The first segmented audio commentary data (segmented ENAV contents) is downloaded to audio buffer A in accordance with an instruction of the ENAV document. That is, by switching an input switch, the first segmented audio commentary data (segmented ENAV contents) is downloaded to audio buffer A (state 1).

After the first segmented audio commentary data is downloaded to audio buffer A, the DVD-Video contents and audio commentary data begin to be played back. Since the first audio commentary data is stored in audio buffer A, an output switch is switched to the audio buffer A side, and the audio commentary data stored in audio buffer A is sent to the audio decoder 2083 in the element decoder 208, thus starting playback. At the same time, the input switch is switched to the audio buffer B side, and the second segmented audio commentary data (segmented ENAV contents) is downloaded to audio buffer B (state 2).

After the second segmented audio commentary data is downloaded to audio buffer B, and playback of the first segmented audio commentary data is complete, the second segmented audio commentary data is sent from audio buffer B to the audio decoder 2083 and is played back. At this time, the audio commentary data recorded on audio buffer A is erased, and the third segmented audio commentary data is newly downloaded to audio buffer A. That is, the input switch is switched to the audio buffer A side, and the output switch is switched to the audio buffer B side (state 1).

By repeating states 1 and 2, using the audio commentary buffer 2093 with a small capacity, audio commentary data can be played back in synchronism with the DVD-Video contents while being downloaded from the server unit.

Figure 11:
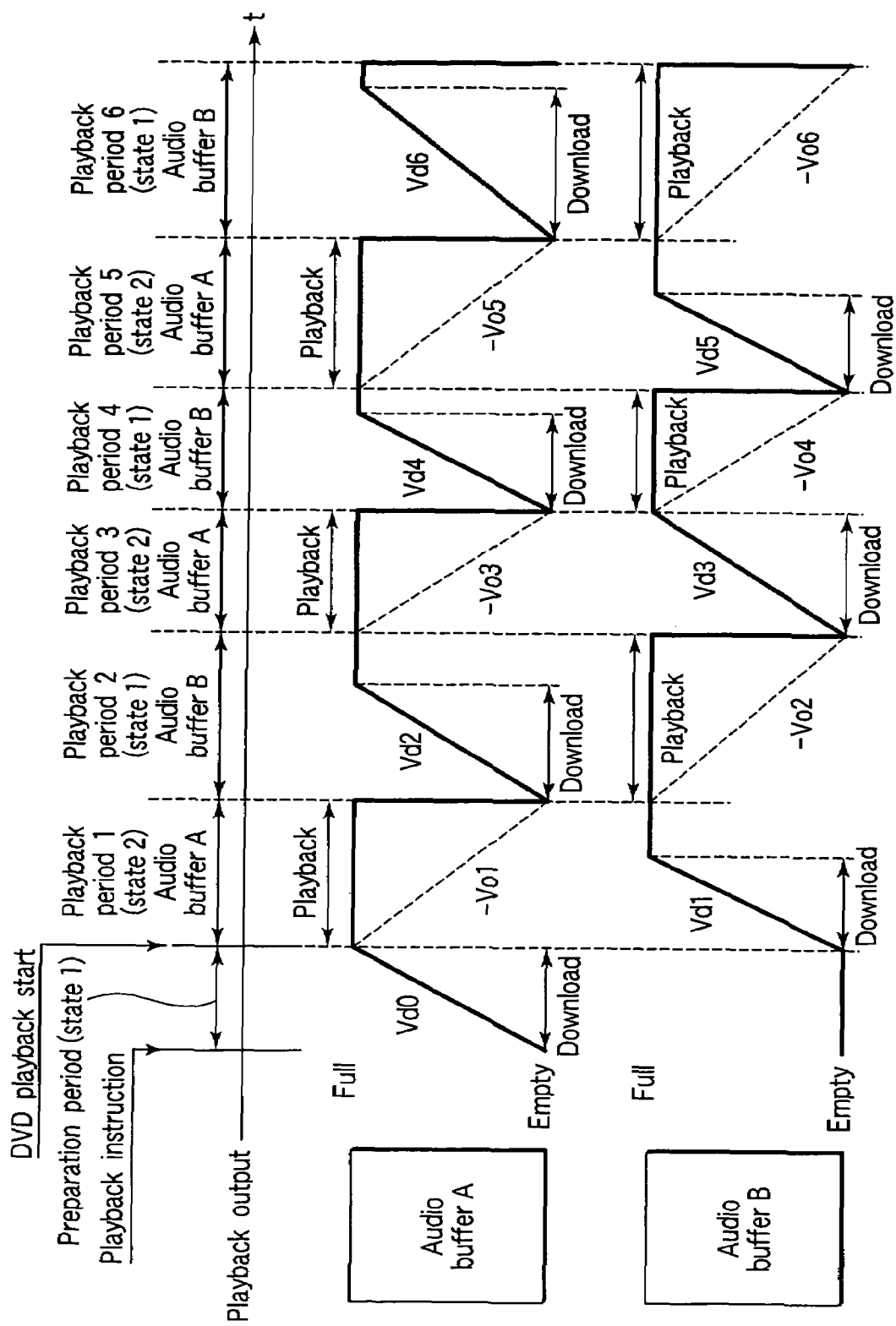
FIG. 11 is a chart for explaining the download timings of segmented ENAV contents to the audio commentary buffer, and the playback timings of the downloaded segmented ENAV contents in detail.

The download timings of segmented ENAV contents to audio buffers A and B of the audio commentary buffer 2093, and the playback timings of the downloaded segmented ENAV contents will be explained below with reference to FIG. 11. The downloaded ENAV contents are played back in synchronism with playback of the DVD-Video contents.

The average download rate upon downloading ENAV contents from the server unit 500 to the preload/download buffer unit 209 during playback period i is defined by Vdi (i=0 to 6). Also, the average read rate upon reading out ENAV contents from the preload/download buffer unit 209 to the audio decoder 2083 of the element decoder 208 during playback period i is defined by Voi (i=1 to 6). Note that the average download rate of the download process before the beginning of DVD-Video playback is Vd0.

Upon reception of a DVD playback request, the player downloads segmented ENAV contents from the server unit 500 to audio buffer A (average download rate Vd0). At this time, audio buffer A may not become full depending on the data size of the segmented ENAV contents (preparation period).

After audio buffer A becomes full of data (or up to a given capacity), i.e., the download process of the segmented ENAV contents is completed, the downloaded segmented ENAV contents are read out to the audio decoder 2083 of the element decoder 208 (average read rate Vo1). At the same time, DVD-Video playback starts, i.e., synchronous playback of the segmented ENAV contents decoded by the audio decoder 2083 of the element decoder 208 and the DVD-Video contents starts. At this time, audio buffer B downloads segmented ENAV contents from the server unit 500 (average download rate Vd1). That is, at this time, the segmented ENAV contents recorded on audio buffer A are played back (playback period 1).

Upon completion of playback of all the segmented ENAV contents recorded on audio buffer A, all the segmented ENAV contents which have been already read out and are not required are erased from audio buffer A. Audio buffer A downloads segmented ENAV contents from the server unit 500 again (average download rate Vd2). Audio buffer B sends the downloaded segmented ENAV contents to the audio decoder 2083 of the element decoder 208 (average read rate Vo2). That is, at this time, the segmented ENAV contents recorded on audio buffer B are played back (playback period 2).

As described above, one buffer (audio buffer A or B) is used to download segmented ENAV contents, and the other buffer (audio buffer A or B) is used to play back segmented ENAV contents. Audio buffers A and B are selectively used under the control of the buffer manager 204.

In order to seamlessly play back the DVD-Video contents and ENAV contents, the following essential condition must be set in all playback periods i.

$$Vdi \geq Voi\ (i \geq 1)$$

If this condition is not met, the playback process of the DVD-Video contents is paused until the download process of the ENAV contents is completed. Or the ENAV contents cannot be played back during the next playback period or a part of that playback period immediately after the condition cannot be met. That is, no sound is generated.

When the user makes a fastforwarding, rewinding, skip, or pause operation during playback of audio commentary data in synchronism with the DVD-Video contents, and then restarts playback, the audio commentary data must be played back in correspondence with the restart position of playback. When the user makes a fastforwarding, rewinding, or skip operation, audio commentary data must be played back at least from the jumped position, or when the user makes a pause operation, it must be played back at least from the paused position. That is, playback must be made from an arbitrary position of audio commentary data.

FIG. 12 shows an example of the data structure of ENAV contents to which information is appended to achieve synchronization with the DVD-Video contents.

ENAV contents include at least one of a plurality of data such as audio, animation/moving picture, still picture, font, and the like. As shown in FIG. 12, ENAV contents include one or more segmented ENAV contents. In other words, ENAV contents can be provided while being segmented into a plurality of data. For example, even when the data size of given ENAV contents is sufficiently larger than the storage capacity of the preload/download buffer unit 209, the ENAV contents can be provided while being segmented into a plurality of data since the ENAV contents have the data structure shown in FIG. 12.

For example, audio commentary data to be played back in synchronism with the DVD-Video contents, as described above, is segmented, and is provided with a size that can be stored in audio buffer A or B. In this manner, since ENAV contents are provided as segmented data, the storage capacity of the preload/download buffer unit 209 can be reduced, and a time required until playback start can be shortened.

Furthermore, the segmented ENAV contents include ENAV data which forms audio, animation/moving picture, still picture, font, or the like, and an ENAV header indicating attribute information of this ENAV data.

The ENAV header includes ENAV data information, a title number, absolute time, chapter number, relative time, playback time, data size, segment number, total segment count, index count, index time, index position, and the like.

The ENAV data information indicates an attribute of the ENAV data. The title number indicates that assigned to a title of the DVD-Video contents, with which the head of the ENAV data is synchronized. The absolute time indicates a time from the head of the title of the DVD-Video contents, with which the head of the ENAV data is synchronized. The title contained in the DVD-Video contents includes playback information for a predetermined unit to which time information is assigned. Based on the title number and absolute time contained in the ENAV header of the segmented ENAV contents, predetermined ENAV data can be played back in synchronism with playback of playback information for a predetermined unit, which is contained in the title of the DVD-Video contents.

The chapter number indicates that assigned to a chapter of the DVD-Video contents, with which the head of the ENAV data is synchronized. The relative time indicates a time from the head of the chapter of the DVD-Video contents, with which the head of the ENAV data is synchronized. The chapter contained in the DVD-Video contents includes playback information for a predetermined unit to which time information is assigned. Based on the chapter number and relative time contained in the ENAV header of the segmented ENAV contents, predetermined ENAV data can be played back in synchronism with playback of playback information for a predetermined unit, which is contained in the chapter of the DVD-Video contents.

The playback time indicates a time required to play back the ENAV data. The data size indicates that of the ENAV data (or the ENAV header corresponding to this ENAV data). Also, in case that the data is encoded in constant bitrate, the data size indicates the data size per second or per frame.

The total segment count indicates the total number of segmented ENAV contents. The segment number indicates the order of the segmented ENAV contents. In case of non-segmented ENAV data, the total segment count=1 and the segment number=1 are recorded. The index time indicates a relative time from the head of the segmented ENAV contents so as to access a position other than the head of the ENAV data. The index position (n) indicates the position (can be expressed by a relative position from the head of the segmented ENAV contents or a relative position from the head of the ENAV data) of data corresponding to the index time (n). A plurality of sets of index times and index positions can be recorded. The index count indicates the total number of indices recorded in the segmented ENAV contents.

For example, when segmented ENAV contents are 10-sec unit data, since access to the segmented ENAV contents is limited to its head, only access for each 10-sec unit is allowed. However, as indices, nine index times, i.e., 1 sec, 2 sec, 3 sec, . . . , 8 sec, and 9 sec from the head of the segmented ENAV contents, and index positions are defined (index count=9). Then, access to an arbitrary position in ENAV contents is allowed. In the above example, access for each 1-sec unit in the ENAV contents is allowed. When the access precision must be improved, indices can be further added.

Based on the index times and index positions contained in the ENAV header of the segmented ENAV contents, predetermined ENAV data can be played back in synchronism with playback of predetermined playback information of the DVD-Video contents.

When each segmented ENAV contents are formed as one file, some pieces of information in the ENAV header can be recorded as a file name. For example, if file names of segmented ENAV contents are defined as AC_00001.AC3, AC_00002.AC3, AC_00003.AC3, . . . , the segment number need not be recorded in the ENAV header. Also, the absolute time may be expressed in seconds, and can be defined as a file name like AC_00000.MPG, AC_00010.MPG, AC_00020.MPG, . . . .

When ENAV contents data is segmented, and additional information is recorded, as described above, required ENAV contents can be searched for upon restarting playback, and can be played back in synchronism with the DVD-Video contents even in a special playback mode such as fastforwarding, rewinding, and the like.

Figure 13:
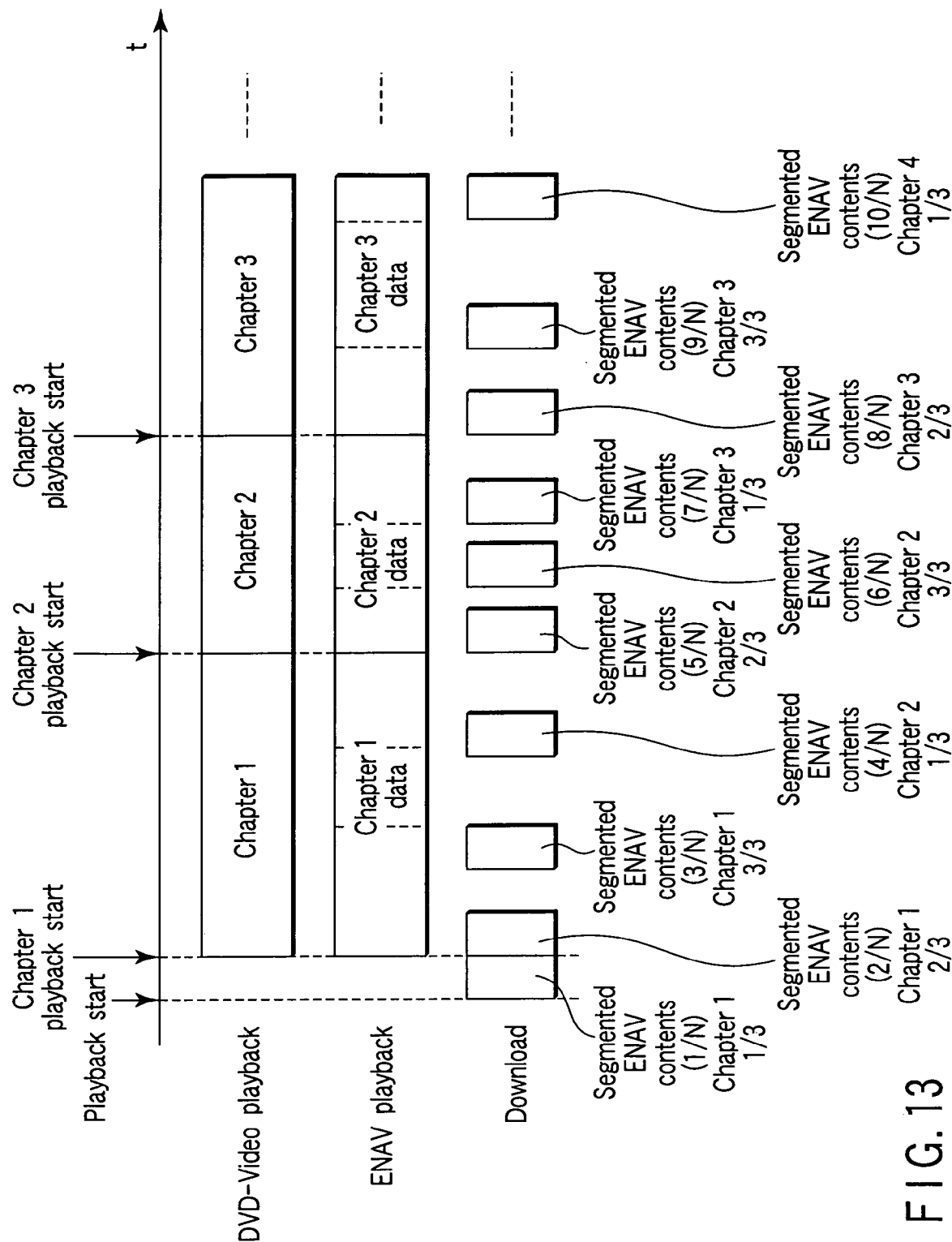
FIG. 13 is a chart for explaining the process for playing back segmented ENAV contents while downloading them.

FIGS. 13 to 15 show examples when ENAV contents are played back in synchronism with the DVD-Video contents.

FIG. 13 is a chart for explaining the process for playing back segmented ENAV contents while downloading segmented ENAV contents using the audio commentary buffer 2093. For example, assume that ENAV contents are segmented into nine segmented ENAV contents as follows:

three segmented ENAV contents (segmented ENAV contents 1 to 3) synchronized with chapter 1 of the DVD-Video contents three segmented ENAV contents (segmented ENAV contents 4 to 6) synchronized with chapter 2 of the DVD-Video contents three segmented ENAV contents (segmented ENAV contents 7 to 9) synchronized with chapter 3 of the DVD-Video contents Upon reception of a playback start instruction, the player downloads segmented ENAV contents 1 first. That is, the player sequentially acquires ENAV contents from the external server unit 500 via a communication line, and buffers them to a predetermined buffer in accordance with the type of the ENAV contents. Upon completion of downloading of a part of ENAV contents, i.e., segmented ENAV contents 1, the player starts playback of the DVD-Video contents. At this time, the player downloads segmented ENAV contents 2 while playing back segmented ENAV contents 1. Next, the player downloads segmented ENAV contents 3 when it plays back segmented ENAV contents 2. By repeating the above process, the ENAV contents and DVD-Video contents can be synchronously played back.

FIG. 14 is a chart for explaining playback when the user skips the contents to chapter 2 while synchronously playing back chapter 1 of the DVD-Video contents and ENAV contents. In this example as well, as in the case of FIG. 13, ENAV contents corresponding to one chapter are segmented into three segmented ENAV contents.

Upon reception of a playback start instruction, the player downloads segmented ENAV contents 1 first. Upon completion of downloading, the player starts playback of the DVD-Video contents. At this time, as in FIG. 13, the player downloads segmented ENAV contents. 2 while playing back segmented ENAV contents 1. Also, the player downloads segmented ENAV contents 3 while playing back segmented ENAV contents 2.

For example, when the user presses a skip button upon playing back chapter 1 (segmented ENAV contents 3) and requests to play back chapter 2 as the next chapter, the player confirms whether or not the audio commentary buffer 2093 stores ENAV contents data (segmented ENAV contents 4) of chapter 2. In this example, since the download process of segmented ENAV contents 4 is complete upon reception of a skip instruction, playback of chapter 2 of the DVD-Video contents and that of segmented ENAV contents 4 can be immediately started. At this time, the player continues to download segmented ENAV contents 5.

FIG. 15 is a chart for explaining playback when the user skips the contents to later chapter 6 while synchronously playing back chapter 1 of the DVD-Video contents and ENAV contents. In this example, as in the example shown in FIG. 13, ENAV contents corresponding to one chapter are segmented into three segmented ENAV contents.

three segmented ENAV contents (segmented ENAV contents 1 to 3) synchronized with chapter 1 of the DVD-Video contents three segmented ENAV contents (segmented ENAV contents k to (k+2)) synchronized with chapter 6 of the DVD-Video contents three segmented ENAV contents (segmented ENAV contents (k+3) to (k+5)) synchronized with chapter 7 of the DVD-Video contents Upon reception of a playback start instruction, the player downloads segmented ENAV contents 1 first. Upon completion of downloading, the player starts playback of the DVD-Video contents. At this time, as in FIG. 13, the player downloads segmented ENAV contents 2 while playing back segmented ENAV contents 1. Also, the player downloads segmented ENAV contents 3 while playing back segmented ENAV contents 2.

For example, when the user presses a skip button upon playing back chapter 1 (segmented ENAV contents 3) and requests to play back chapter 6 as a later chapter, the player confirms whether or not the audio commentary buffer 2093 stores ENAV contents data (segmented ENAV contents k) of chapter 6. In this example, the player is downloading segmented ENAV contents 4 to be synchronized with chapter 2 at the time of reception of a skip instruction, and does not download ENAV contents data required to play back chapter 6 yet. Hence, the player aborts downloading of segmented ENAV contents 4, and downloads segmented ENAV contents k required to play back chapter 6 as a skip destination. At this time, the player pauses playback of chapter 6 of the DVD-Video contents until the download process of segmented ENAV contents k is completed. Upon completion of downloading of segmented ENAV contents k, the player plays back chapter 6 of the DVD-Video contents and segmented ENAV contents k, and downloads the next segmented ENAV contents (k+1).

The process for searching for and playing back required segmented ENAV contents upon starting playback from an arbitrary position of the DVD-Video contents will be described below with reference to FIGS. 16 and 17.

For example, when the DVD-Video contents are played back from the beginning of a title, ENAV contents are played back from its beginning simultaneously with playback back from the beginning of the DVD-Video contents. In this manner, the DVD-Video contents and ENAV contents can be synchronously played back. On the other hand, the DVD-Video contents are sometimes played back from an arbitrary position. For example, the DVD-Video contents are sometimes played back from an arbitrarily designated position like in a time search. Or the DVD-Video contents are sometimes played back from an arbitrarily designated chapter like in playback after skip. As shown in FIG. 12, ENAV contents must be segmented, and information required to achieve synchronization with the DVD-Video contents must be provided to each segmented ENAV contents.

Figure 16:
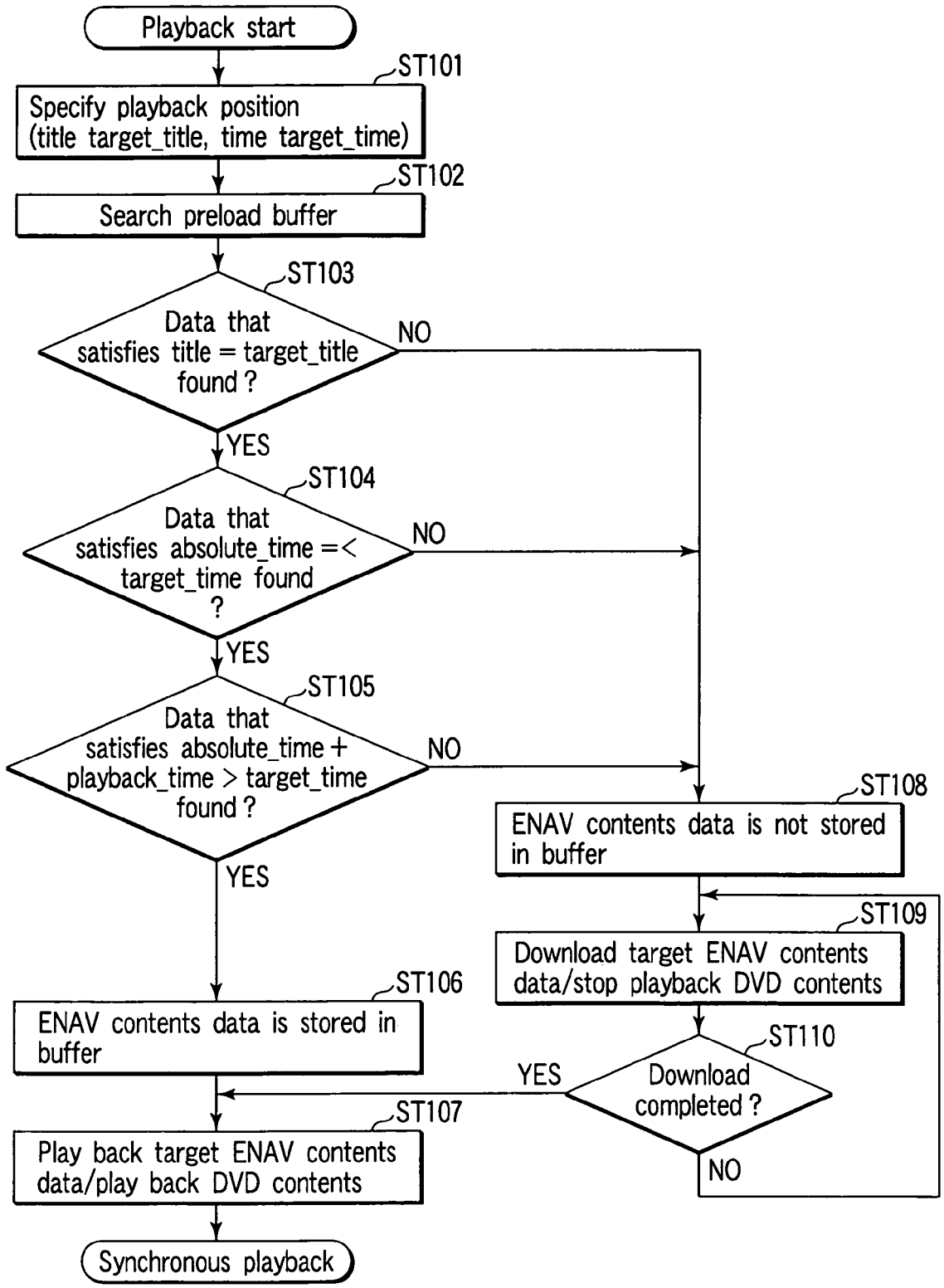
FIG. 16 is a flow chart for explaining the process for searching for required segmented ENAV contents on the basis of an absolute time upon playing back DVD-Video contents from an arbitrary position.

FIG. 16 is a flow chart showing an example wherein segmented ENAV contents to be played back are searched for using a title and time information from the head of the title.

The player searches if the preload/download buffer unit 209 stores segmented ENAV contents data corresponding to the playback position of the DVD-Video contents (ST102). Assume that the playback position is specified by designating the title number (target_title) and a time (target_time) from the title start position (ST101). The player searches the preload/download buffer unit 209 for segmented ENAV contents data having the same title number as target_title as the ENAV header (ST103).

The player searches the found segmented ENAV contents data for segmented ENAV contents, which have the absolute time (absolute_time) and playback time (playback_time) that meet:

$$\text{absolute\_time} \leq \text{target\_time} < \text{absolute\_time} + \text{playback\_time}$$

as the ENAV header (ST104, ST105).

If target segmented ENAV contents data is not found (ST103, NO; ST104, NO; ST105, NO), it is determined that the preload/download buffer unit 209 does not store any segmented ENAV contents data to be played back in synchronism with the designated DVD Video contents (ST108). In this case, segmented ENAV contents which meet the aforementioned condition must be downloaded from the server unit 500 (ST109). At this time, playback of the DVD Video contents is paused until downloading of the segmented ENAV contents is completed (ST109).

If the preload/download buffer unit 209 stores segmented ENAV contents to be played back in synchronism with the designated DVD-Video contents (ST106), or if downloading of the designated segmented ENAV contents from the server unit 500 is complete (ST110, YES), the corresponding segmented ENAV contents are played back in synchronism with the DVD-Video contents (ST107).

If absolute_time=target_time, synchronous playback of the DVD-Video contents and ENAV contents can be implemented by synchronously playing back the corresponding segmented ENAV contents and the designated DVD-Video contents position.

If $$\text{absolute\_time} < \text{target\_time} < \text{absolute\_time} + \text{playback\_time}$$

a time difference target_time−absolute_time is generated.

At this time, playback is made from an intermediate position (target_time) of the corresponding segmented ENAV contents data. That is, if the corresponding segmented ENAV contents have indices, index k that meets:

target_time=absolute_time+index time *k* is searched for, and playback is made from that index position k.

If playback from the intermediate position is not possible, the segmented ENAV contents are played back first, and playback of the DVD-Video contents starts after an elapse of a delay time target_time−absolute_time. In this way, synchronous playback of the DVD-Video contents and ENAV contents is implemented. In addition, segmented ENAV contents data next to the found segmented ENAV contents, i.e., ENAV data which has an ENAV header with a segment number larger by 1, is played back a delay time absolute_time++ playback_time−target_time after playback of the DVD-Video contents, thus also implementing synchronous playback of the DVD-Video contents and ENAV contents.

Figure 17:
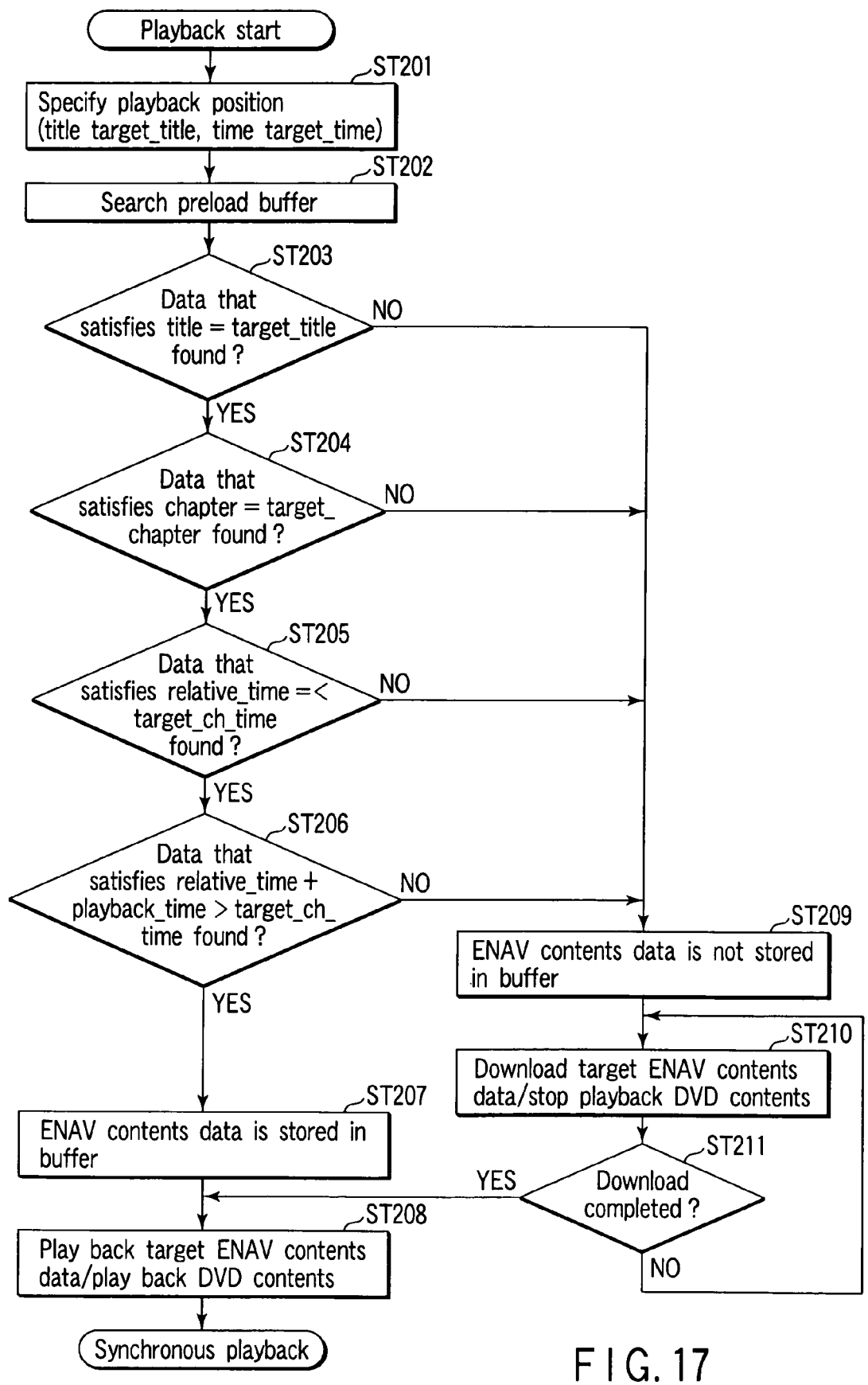
FIG. 17 is a flow chart for explaining the process for searching for required segmented ENAV contents on the basis of a relative time upon playing back DVD-Video contents from an arbitrary position.

FIG. 17 is a flow chart showing the flow of searching for segmented ENAV contents data using a title and time information from the head of the title.

The player searches if the preload/download buffer unit 209 stores segmented ENAV contents data corresponding to the playback position of the DVD-Video contents (ST202). Assume that the playback position is specified by designating the title number (target_title), chapter number (target_chapter), and a time (target_ch_time) from the chapter start position (ST201). The player searches the preload/download buffer unit 209 for segmented ENAV contents data having the same title number as target_title as the ENAV header (ST203).

The player searches the found segmented ENAV contents data for segmented ENAV contents, which have the same chapter number as target_chapter as the ENAV header (ST204). Furthermore, the player searches the found segmented ENAV contents data for segmented ENAV contents, which have the absolute time and playback time that meet:

relative time (relative_time)
≦target_ch_time<relative_time+playback_time as the ENAV header (ST205, ST206).

If target segmented ENAV contents data is not found (ST203, NO; ST204, NO; ST205, NO; ST206, NO), it is determined that the preload/download buffer unit 209 does not store any segmented ENAV contents data to be played back in synchronism with the designated DVD Video contents (ST209). In this case, segmented ENAV contents which meet the aforementioned condition must be downloaded from the server unit 500 (ST210). At this time, playback of the DVD Video contents is paused until downloading of the segmented ENAV contents is completed (ST210).

If the preload/download buffer unit 209 stores segmented ENAV contents to be played back in synchronism with the designated DVD-Video contents (ST207), or if downloading of the designated segmented ENAV contents from the server unit 500 is complete (ST211, YES), the corresponding segmented ENAV contents are played back in synchronism with the DVD-Video contents (ST208).

If relative_time=target_ch_time, synchronous playback of the DVD-Video contents and ENAV contents can be implemented by synchronously playing back the corresponding segmented ENAV contents and the designated DVD-Video contents position.

If relative_time<target_ch_time<relative_time+playback_time a time difference target_ch_time−absolute_time is generated.

At this time, playback is made from an intermediate position (target_ch_time) of the corresponding segmented ENAV contents data. That is, if the corresponding segmented ENAV contents have indices, index k that meets:

target_time=relative_time+index time k is searched for, and playback is made from that index position k.

If playback from an intermediate position is not possible, the segmented ENAV contents are played back first, and playback of the DVD-Video contents starts after an elapse of a delay time target_ch_time−relative_time. In this way, synchronous playback of the DVD-Video contents and ENAV contents is implemented. In addition, segmented ENAV contents data next to the found segmented ENAV contents, i.e., ENAV data which has an ENAV header with a segment number larger by 1, is played back a delay time relative_time+ playback_time−target_ch_time after playback of the DVD-Video contents, thus also implementing synchronous playback of the DVD-Video contents and ENAV contents.

Figure 18:
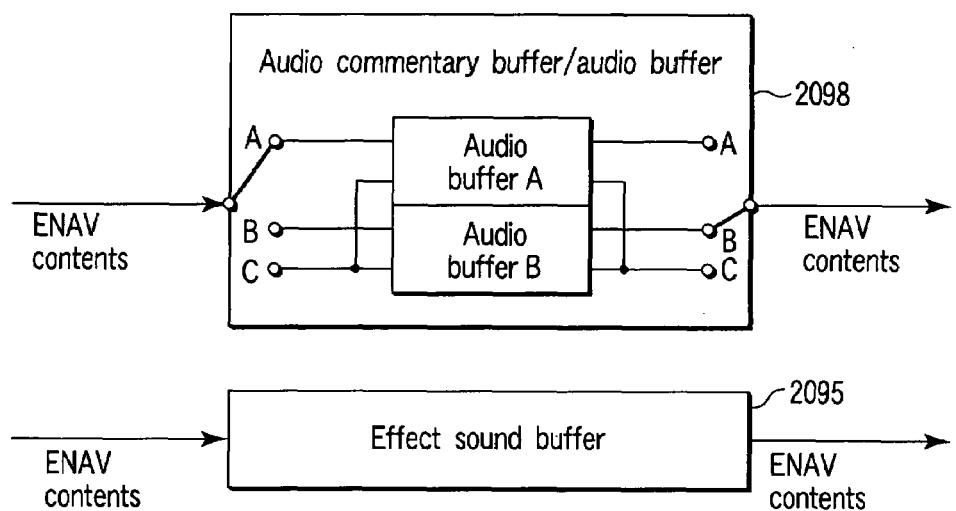
FIG. 18 is a schematic diagram showing the arrangement of a shared buffer which shares the functions of the audio commentary buffer and an audio buffer.

FIG. 18 shows an example wherein a shared buffer is used in place of the audio commentary buffer 2093 and audio buffer 2094.

For example, even during playback of audio commentary data in synchronism with playback of a DVD title, effect sounds such as alarm tones, click tones, and the like are required. That is, the audio commentary data and effect sound data are independently played back, and are output after they are mixed. The same applies to audio data such as audio clip data and the effect sound data. However, the audio commentary data and audio data such as audio clip data need not always be output at the same time. In other words, the audio commentary buffer 2093 and audio buffer 2094 need not always coexist.

Hence, a shared buffer (audio commentary buffer/audio buffer) 2098 which is shared by the audio commentary buffer 2093 and audio buffer 2094 is adopted, as shown in FIG. 18. That is, the shared buffer 2098 is adopted in place of the audio commentary buffer 2093 and audio buffer 2094. The shared buffer 2098 comprises audio buffers A and B, as shown in FIG. 18.

The operation of the shared buffer 2098 will be described below. When the shared buffer 2098 serves as an audio commentary buffer, audio buffers A and B serve as two buffers. On the other hand, when the shared buffer 2098 serves as an audio buffer, audio buffers A and B serve as a single, large buffer. In this way, the audio commentary buffer 2093 and audio buffer 2094 need not be independently prepared in the player, and the buffer in the player can be efficiently used.

When the shared buffer 2098 serves as an audio commentary buffer, an input switch is connected to audio buffer A (input terminal A), and an output switch is connected to audio buffer B (output terminal B), as shown in FIG. 10. In this way, ENAV contents are downloaded to audio buffer A (state 1).

Next, the input switch is connected to audio buffer B (input terminal B), and the output switch is connected to audio buffer A (output terminal A). As a result, ENAV contents are downloaded to audio buffer B, and the ENAV contents already downloaded on audio buffer A are output (state 2).

Again, the input switch is connected to audio buffer A (input terminal A), and the output switch is connected to audio buffer B (output terminal B). As a result, ENAV contents are downloaded to audio buffer A again, and the ENAV contents already downloaded on audio buffer B are output (state 1).

By repeating states 1 and 2, using the shared buffer 2098 with a small capacity, audio commentary data can be played back in synchronism with the DVD-Video contents while being downloaded from the server unit.

When the shared buffer 2098 serves as an audio buffer, the input switch is connected to input terminal C that can share audio buffers A and B, and the output switch is also connected to output terminal C that can share audio buffers A and B. As a result, ENAV contents can be preloaded/downloaded to and can be read out from audio buffers A and B without discrimination.

Figure 19:
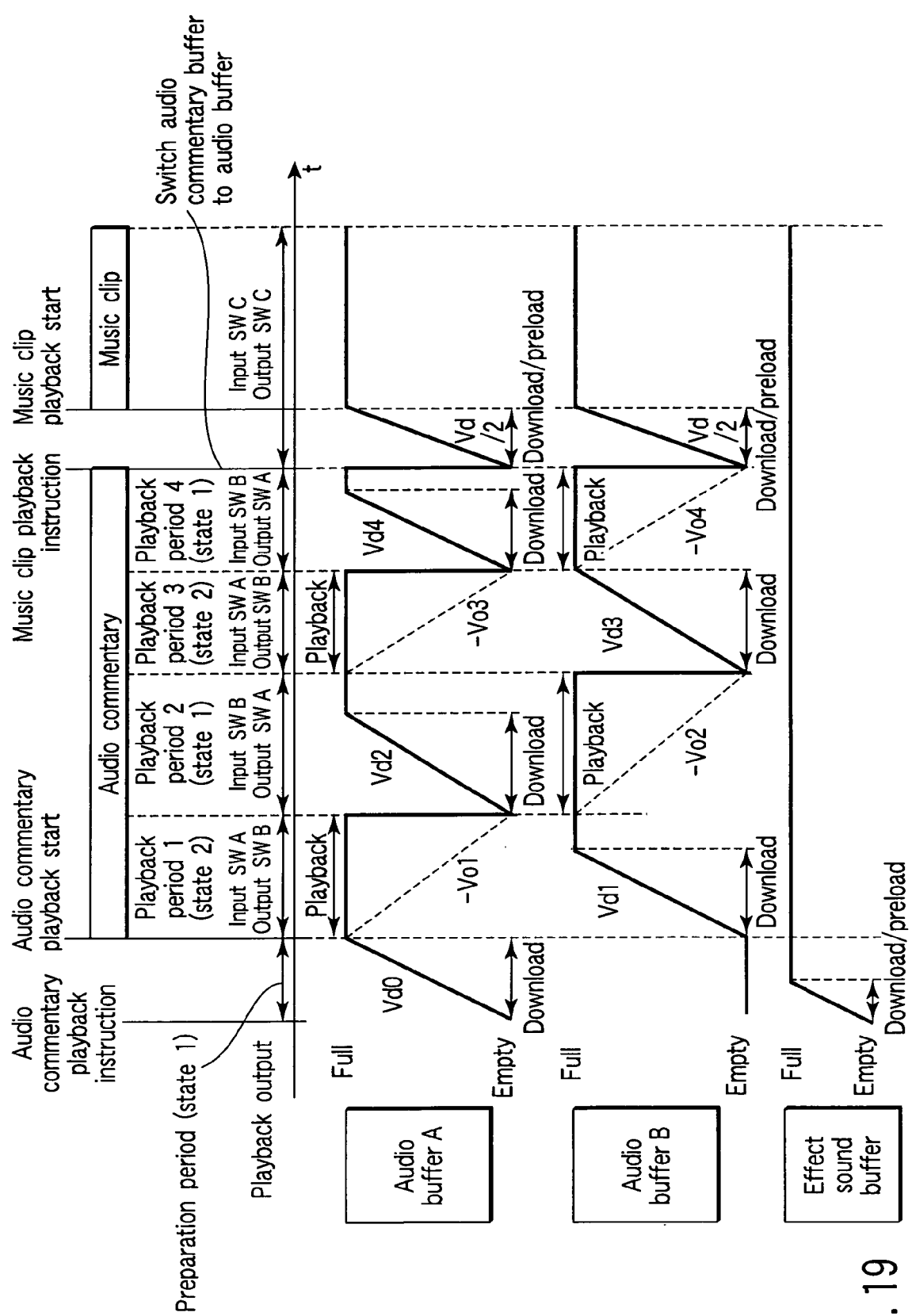
FIG. 19 is a chart for explaining the switching timings of the functions of the shared buffer.

FIG. 19 is a chart showing an example wherein the shared buffer 2098 serves as an audio commentary buffer first, and then as an audio buffer.

The average download rate upon downloading ENAV contents from the server unit 500 to the shared buffer 2098 during playback period i is defined by Vdi (i=0 to 4). Also, the average read rate upon reading out ENAV contents from the shared buffer 2098 to the audio decoder 2083 of the element decoder 208 during playback period i is defined by Voi (i=1 to 4). Note that the average download rate of the download process before the beginning of DVD-Video playback is Vd0. Furthermore, the average download rate upon downloading ENAV contents for a music clip is Vd.

Upon reception of a DVD playback request, the player downloads segmented ENAV contents from the server unit 500 to audio buffer A of the shared buffer 2098 (average download rate Vd0). At this time, audio buffer A may not become full depending on the data size of the segmented ENAV contents (preparation period: input switch-A, output switch-B).

At the same time, the player preloads/downloads ENAV contents for requested effect sounds to the effect sound buffer 2095. In this way, effect sounds can be played back even during playback of audio commentary or music clip.

After audio buffer A becomes full of data (or up to a given capacity), i.e., the download process of the segmented ENAV contents is completed, the downloaded segmented ENAV contents are read out to the audio decoder 2083 of the element decoder 208 (average read rate Vo1). At the same time, DVD-Video playback starts, i.e., synchronous playback of the segmented ENAV contents decoded by the audio decoder 2083 of the element decoder 208 and the DVD-Video contents starts. At this time, audio buffer B downloads segmented ENAV contents from the server unit 500 (average download rate Vd1). That is, at this time, the segmented ENAV contents recorded on audio buffer A are played back (playback period 1: input switch-B, output switch-A).

Upon completion of playback of all the segmented ENAV contents recorded on audio buffer A, all the segmented ENAV contents which have been already read out and are not required are erased from audio buffer A. Audio buffer A downloads segmented ENAV contents from the server unit 500 again (average download rate Vd2). Audio buffer B sends the downloaded segmented ENAV contents to the audio decoder 2083 of the element decoder 208 (average read rate Vo2). That is, at this time, the segmented ENAV contents recorded on audio buffer B are played back (playback period 2: input switch-B, output switch-A).

Assume that the aforementioned process is repeated, and a music clip playback instruction is issued at the time of completion of playback period 4. At this time, the contents of audio buffers A and B are erased. Furthermore, the input switch is switched to input terminal C, and the output switch is switched to output terminal C. Then, ENAV contents for a music clip are downloaded to audio buffers A and B (the average download rate of each buffer is Vd/2). As soon as the download process is complete, music clip playback starts.

As described above, by switching the shared buffer 2098 to an audio commentary buffer or audio buffer, the required buffer size can be saved. Note that switching between the audio commentary buffer and audio buffer is controlled under the buffer control of the buffer manager 204.

Figure 20:
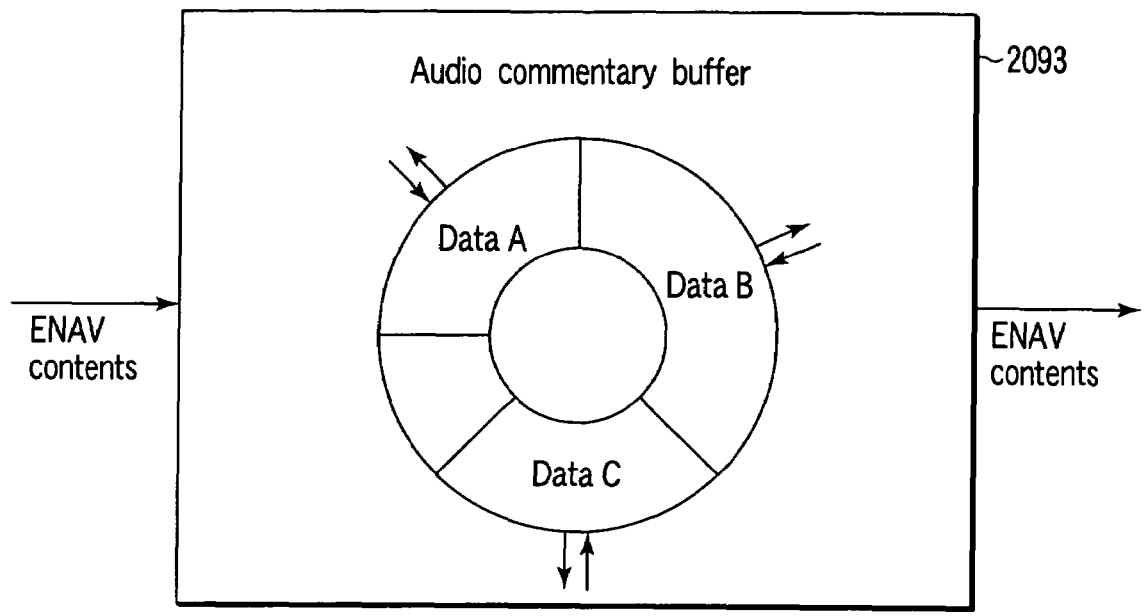
FIG. 20 shows an example of the audio commentary buffer which comprises a ring buffer, or the shared buffer which comprises a ring buffer.

The audio commentary buffer 2093 which comprises two buffers (double buffers), i.e., audio buffers A and B have been explained. The shared buffer (audio commentary buffer/audio buffer) 2098 which comprises two buffers (double buffers), i.e., audio buffers A and B have been explained. However, the present invention is not limited to the audio commentary buffer 2093 and the shared buffer 2098. For example, the present invention can be implemented using a ring buffer in place of audio buffers A and B. FIG. 20 shows an example of the audio commentary buffer 2093 which comprises a ring buffer, or the shared buffer 2098 which comprises a ring buffer.

Figure 21:
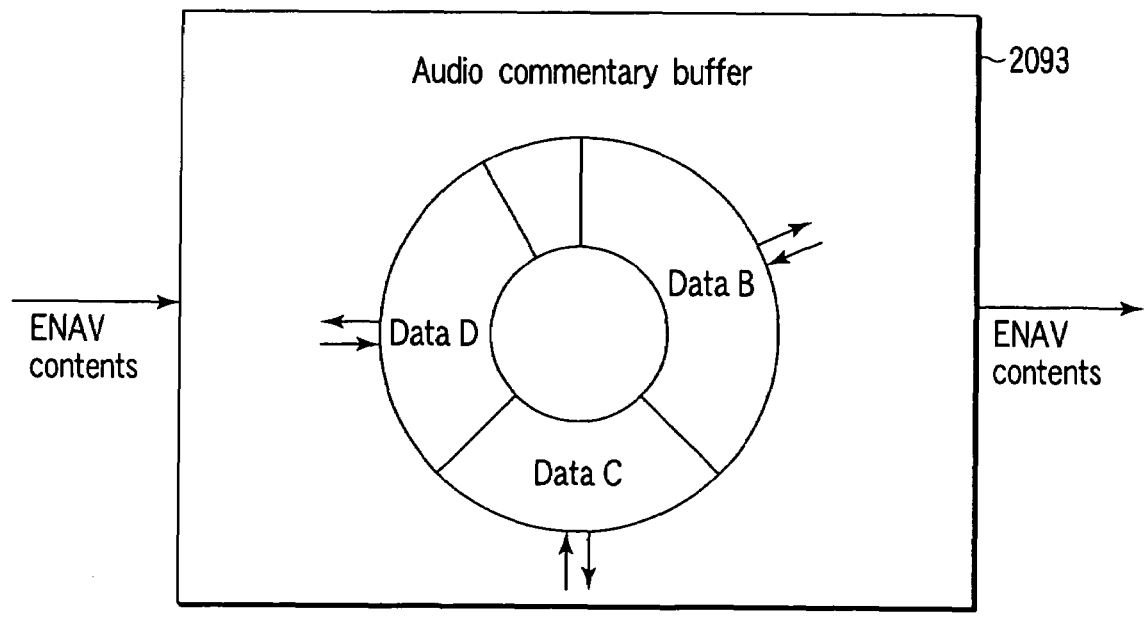
FIG. 21 is a view for explaining an outline of the operation of the audio commentary buffer which comprises a ring buffer, or the shared buffer which comprises a ring buffer.

The ring buffer is configured so that the start and end addresses of the storage area are adjacent to each other, and can store data in sequence regardless of the buffer size. When data are recorded in sequence in the ring buffer, the oldest data of those written in this ring buffer is overwritten by new data. For example, a case will be described below wherein data A, B, C, and D obtained by segmenting ENAV contents are recorded in the ring buffer in turn. Assume that data A, B, and C have been recorded in turn in the ring buffer, as shown in FIG. 20. At this time, when the remaining capacity of the ring buffer is larger than the size of data D, data D can be recorded in the ring buffer. However, when the remaining capacity of the ring buffer is smaller than the size of data D, data A as the oldest data is erased, and data D is recorded to be continuous with data C, as shown in FIG. 21. If data D cannot be recorded due to a short remaining capacity of the ring buffer even after data A is erased from the ring buffer, data B is also erased from the ring buffer. When data are recorded in this way, the ENAV contents acquired from the server as segmented data can be continuously handled on the ring buffer.

As described above, using the audio commentary buffer 2093 which comprises a ring buffer or the shared buffer 2098 which comprises a ring buffer, the control can be simplified compared to that using the audio commentary buffer 2093 which comprises double buffers or the shared buffer 2098 which comprises double buffers. Also, Even when the segmented data of the ENAV contents have largely different sizes, an extra recording area can be prevented from being wasted (the recording area can be efficiently used).

However, in the ring buffer, the following condition must be met as in the double buffers.

average read rate≦average download rate.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An information playback apparatus comprising:
 a first acquisition unit configured to acquire contents from an information storage medium;
 a second acquisition unit configured to acquire expansion information from at least one of the information storage medium and an external apparatus via a communication line;
 a storage unit configured to store the expansion information acquired by the second acquisition unit in accordance with a type of the expansion information;
 a control unit configured to control input of the expansion information to the storage unit and output of the expansion information from the storage unit; and
 a playback unit configured to play back the contents acquired by the first acquisition unit, and to play back the expansion information stored in the storage unit in synchronism with playback of the contents,
 wherein each of segmented memory spaces of the storage unit stores a plurality of pieces of segmented expansion information which form a first type of expansion information on the basis of input control by the control unit when the first type of expansion information is to be stored, the first type of expansion information stored in the storage unit being output on the basis of output control by the control unit, the segmented memory spaces of the storage unit are integrated to store a second type of expansion information on the basis of input control by the control unit when the second type of expansion information is to be stored, the second type of expansion information stored in the storage unit being output on the basis of output control by the control unit, the control unit varies a storing method according to the first or second type of expansion information for synchronism playback on the basis of a data description language contained in the expansion information, the contents contain predetermined playback information assigned with time information, the expansion information contains at least one segmented expansion information, one segmented expansion information contains header information and main body expansion information, the header information contains time information, and the playback unit plays back predetermined main body expansion information on the basis of the time information contained in the header information of the segmented expansion information in synchronism with playback of predetermined playback information contained in the contents.

2. An information playback method comprising:

acquiring expansion information from at least one of an information storage medium and an external apparatus via a communication line;

storing, in a storage unit, the expansion information in accordance with a type of information; and playing back the contents acquired from the information storage medium, and playing back the expansion information stored in the storage unit in synchronism with playback of the contents, wherein each of segmented memory spaces of the storage unit stores a plurality of pieces of segmented expansion information which form a first type of expansion information when the first type of expansion information is to be stored, the segmented memory spaces of the storage unit are integrated to store a second type of expansion information when the second type of expansion information is to be stored, a storing method is varied according to the first or second type of expansion information for synchronism playback on the basis of a data description language contained in the expansion information, the contents contain predetermined playback information assigned with time information, the expansion information contains at least one segmented expansion information, one segmented expansion information contains header information and main body expansion information, the header information contains time information, and playing back includes playing back predetermined main body expansion information on the basis of the time information contained in the header information of the segmented expansion information in synchronism with playback of predetermined playback information contained in the contents.

3. An apparatus according to claim 1, wherein the first and second types of expansion information need not always be output at the same time.

4. A method according to claim 2, wherein the first and second types of expansion information need not always be output at the same time.

* * * * *